US009426677B2

(12) United States Patent
Sun et al.

(10) Patent No.: US 9,426,677 B2
(45) Date of Patent: Aug. 23, 2016

(54) METHOD, DEVICE, AND SYSTEM FOR OPTIMIZING A TRADEOFF BETWEEN CAPACITY AND COVERAGE OF A NETWORK

(71) Applicant: Huawei Technologies Co., Ltd., Shenzhen, Guangdong (CN)

(72) Inventors: Chunhua Sun, Shenzhen (CN); Hongcheng Zhuang, Shenzhen (CN); Jietao Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 22 days.

(21) Appl. No.: 14/529,916

(22) Filed: Oct. 31, 2014

(65) Prior Publication Data
US 2015/0057005 A1 Feb. 26, 2015

Related U.S. Application Data

(63) Continuation of application No. PCT/CN2012/084101, filed on Nov. 5, 2012.

(30) Foreign Application Priority Data

May 3, 2012 (CN) .......................... 2012 1 0134621

(51) Int. Cl.
*H04W 40/00* (2009.01)
*H04W 24/02* (2009.01)
(Continued)

(52) U.S. Cl.
CPC ................ *H04W 24/02* (2013.01); *H04W 8/26* (2013.01); *H04W 16/18* (2013.01); *H04W 52/386* (2013.01)

(58) Field of Classification Search
CPC ..... H04W 72/00; H04W 40/00; H04W 16/18; H04W 24/00; H04W 24/02; H04J 1/16; H04J 3/14

USPC .......................................................... 455/450
See application file for complete search history.

(56) References Cited

U.S. PATENT DOCUMENTS

2009/0247206 A1 10/2009 Yacono
2012/0094653 A1 4/2012 Okuda

FOREIGN PATENT DOCUMENTS

CN 102083107 A 6/2011
CN 102111780 A 6/2011
(Continued)

OTHER PUBLICATIONS

Iana Siomina, et al., "Automated Optimization of Service Coverage and Base Station Antenna Configuration in UMTS Networks", IEEE Wireless Communications, Dec. 2006, p. 16-25.
(Continued)

*Primary Examiner* — Huy C Ho

(57) ABSTRACT

The present invention provides a method, a device, and a system for optimizing a tradeoff between capacity and coverage of a network. The method includes: receiving statistical information and a first count that are sent by a base station; establishing at least one coverage cluster; calculating cluster values of all the coverage clusters; acquiring an entire-network coverage hole (CH) value and an entire-network coverage overlap (CO) value; calculating an entire-network utility value according to the entire-network CH value and the entire-network CO value; if the capacity or coverage weight and the antenna downtilt of each base station in all the coverage clusters need to be adjusted, acquiring an adjustment value for the capacity or coverage weight of each base station and an adjustment value for the antenna downtilt of each base station according to an optimization strategy, and sending the adjustment values to a corresponding base station.

33 Claims, 15 Drawing Sheets

(51) Int. Cl.
*H04W 16/18* (2009.01)
*H04W 8/26* (2009.01)
*H04W 52/38* (2009.01)
*H04W 36/00* (2009.01)
*H04J 1/16* (2006.01)

(56) References Cited

FOREIGN PATENT DOCUMENTS

| | | |
|---|---|---|
| CN | 102111781 A | 6/2011 |
| EP | 2 096 887 A1 | 9/2009 |
| EP | 2096887 A1 * | 9/2009 |
| EP | 2 426 978 A1 | 3/2012 |
| EP | 2426978 A1 * | 3/2012 |
| JP | 2011 049813 A | 3/2011 |
| WO | WO 2009/088164 A1 | 7/2009 |

OTHER PUBLICATIONS

Imran Ashraf, et al., "Distributed Radio Coverage Optimization in Enterprise Femtocell Networks", IEEE, 2010, 6 pages.

Richard Combes, et al., "On the use of packet scheduling in self-optimization processes: application to coverage-capacity optimization", WiOpt 2010, p. 98-107.

R. Razavi, et al., "Self-Optimization of Capacity and Coverage in LTE Networks Using a Fuzzy Reinforcement Learning Approach", 21st Annual IEEE International Symposium on Personal, Indoor and Mobile Radio Communications, 2010, p. 1865-1870.

Osman N. C. Yilmaz, et al., "System Level Analysis of Vertical Sectorization for 3GPP LTE", IEEE, 2009, p. 453-457.

* cited by examiner

METHOD, DEVICE, AND SYSTEM FOR OPTIMIZING A TRADEOFF BETWEEN CAPACITY AND COVERAGE OF A NETWORK

CROSS-REFERENCE TO RELATED APPLICATIONS

This application is a continuation of International Application No. PCT/CN2012/084101, filed on Nov. 5, 2012, which claims priority to Chinese Patent Application No. 201210134621.X, filed on May 3, 2012, both of which are hereby incorporated by reference in their entireties.

TECHNICAL FIELD

The present invention relates to the field of communications, and in particular, to a method, a device, and a system for optimizing a tradeoff between capacity and coverage of a network.

BACKGROUND

In 3GPP (The 3rd Generation Partnership Project, The 3rd Generation Partnership Project) standards, a thorough research has been made on a SON (Self-Organized Network, self-organized network), which is a major characteristic of the LTE (Long Term Evolution, Long Term Evolution). A SON is a decentralized network formed by a group of mobile terminal nodes with wireless transceiver devices, a network system capable of rapid deployment and use without depending on existing infrastructure of fixed communication networks, and a self-organizing and self-healing network without any central entities. All network nodes coordinate with each other to perform communication and exchange information through wireless links, thereby implementing sharing of information and services. In the network, two nodes incapable of direct communication may perform packet forwarding be means of other nodes to form a multi-hop communication mode. In a SON, capacity and coverage are two major functions of the SON and capacity and coverage compromise with each other. The main object of the SON is to maximize system capacity while guaranteeing network coverage.

In the prior art, several solutions in the following are adopted to implement the object.

Solution 1: A vertical sectorization method. One cell is divided into an inner cell and an outer cell and each cell is covered at a different antenna downtilt. The inner cell and the outer cell share the original cell power and multiplex the cell bandwidth. Therefore, the system capacity may be optimized through the linear gain of bandwidth multiplexing.

Solution 2: An algorithm for distributed pilot power adjustment. In the algorithm, two different time periods, a large time period and a small time period, are taken into consideration, in which one large time period is formed of a plurality of small time periods. Within a small time period, each cell adjusts pilot power frequently and rapidly based on load information. The load information includes the load information of a current cell and the load information of neighboring cells. Within a time period, each cell adjusts pilot power slowly.

During the implementation of optimizing capacity and coverage of a network, the inventor finds that the prior art at least has the following problems: Solution 1 mainly implements the adjustment of capacity and coverage for a single cell but fails to consider the coverage hole and coverage overlap problems of the entire network; and in Solution 2, each cell is required to know the load information of neighboring cells, thereby increasing the signaling exchange load of a system.

SUMMARY

The embodiments of the present invention provide a method, a device, and a system for optimizing a tradeoff between capacity and coverage of a network, so as to implement the objects of optimizing capacity and coverage of a cell, effectively controlling the coverage hole and coverage overlap performance of the entire network, and at the same time reducing the signaling exchange load of a system.

To achieve the objects, the following technical solutions are adopted in the embodiments of the present invention:

A method for optimizing a tradeoff between capacity and coverage of a network includes: receiving statistical information and a first count that are sent by a base station, where the first count is the number of all user equipments UEs counted by the base station, and the statistical information includes information related to a coverage hole CH of the base station and/or information related to a coverage overlap CO of the base station; establishing at least one coverage cluster according to the received statistical information; calculating cluster values of all the coverage clusters according to the first count and the statistical information, where the coverage cluster is used for recording a base station identifier related to the CH or a base station identifier related to the CO, and the cluster value is a CH value or a CO value of each coverage cluster; acquiring an entire-network CH value and an entire-network CO value according to the cluster values of all the coverage clusters; calculating an entire-network utility value according to the entire-network CH value and the entire-network CO value; determining, according to the entire-network utility value, whether a capacity or coverage weight and an antenna downtilt of each base station in all the coverage clusters need to be adjusted; if the adjustment is needed, acquiring an adjustment value for the capacity or coverage weight of each base station and an adjustment value for the antenna downtilt of each base station according to an optimization strategy; and sending the acquired adjustment value for the capacity or coverage weight of each base station and the acquired adjustment value for the antenna downtilt of each base station to a corresponding base station, so that the base station calculates the optimal pilot power.

A method for optimizing a tradeoff between capacity and coverage of a network includes: receiving, by a base station, coverage information sent by a user equipment UE, where the coverage information includes coverage hole CH information and/or coverage overlap CO information, the CH information includes a first base station identifier, the first base station identifier is used for identifying a base station with a CH detected by a UE that fails to establish a link, and the CO information includes base station identifiers of at least two base stations with reference signal received power RSRP exceeding a first threshold value among all base stations identified by the UE; according to the coverage information, acquiring statistical information, and acquiring a first count; sending the statistical information and the first count to a network controller, so that the network controller establishes at least one coverage cluster according to the statistical information and the first count, learns an entire-network utility value, and determines, according to the entire-network utility value, whether a capacity or coverage weight and an antenna downtilt of each base station in all the coverage clusters need to be adjusted, if the adjustment is needed, acquires an adjustment value for the capacity or coverage weight of each base station and an adjustment value for the antenna downtilt of each base station according to an optimization strategy and sends the adjustment values to a corresponding base station, where the first count is the number of all UEs served in the base station, and the statistical information includes information related to a coverage hole CH of the base station and/or information related to a coverage overlap CO of the base station; receiving the adjustment value for the capacity or coverage weight and the adjustment value for the antenna downtilt sent by a network coordination controller; if neither the adjustment value for the capacity or coverage weight nor the adjustment value for the antenna downtilt is zero, according to the adjustment value for the capacity or coverage weight and the adjustment value for the antenna downtilt, calculating the optimal pilot power; adjusting pilot power of the base station to the calculated optimal pilot power, and adjusting a value of the antenna downtilt to the adjustment value for the antenna downtilt, so as to adjust the capacity and coverage of the base station.

A network coordination controller includes: a first receiving unit, configured to receive statistical information and a first count that are sent by a base station, where the first count is the number of all user equipments UEs counted by the base station, and the statistical information includes information related to a coverage hole CH of the base station and/or information related to a coverage overlap CO of the base station; a first establishment unit, configured to establish at least one coverage cluster according to the received statistical information, where the coverage cluster is used for recording a base station identifier related to the CH or a base station identifier related to the CO; a first calculation unit, configured to calculate cluster values of all the coverage clusters according to the first count and the statistical information, where the cluster value is a CH value or a CO value of each coverage cluster; a first acquisition unit, configured to acquire an entire-network CH value and an entire-network CO value according to the cluster values of all the coverage clusters; a second acquisition unit, configured to calculate an entire-network utility value according to the entire-network CH value and the entire-network CO value; a first determination unit, configured to determine, according to the entire-network utility value, whether an antenna downtilt and a capacity or coverage weight of each base station in all coverage clusters need to be adjusted; a first adjustment unit, configured to, if the adjustment is needed, acquire an adjustment value for the antenna downtilt and an adjustment value for the capacity or coverage weight of each base station according to an optimization strategy; a first sending unit, configured to send the acquired adjustment value for the antenna downtilt of each base station and the acquired adjustment value for the capacity or coverage weight of each base station to a corresponding base station, so that the base station calculates the optimal pilot power.

A base station includes: a first receiving unit, configured to receive coverage information sent by a user equipment UE, where the coverage information includes coverage hole CH information and/or coverage overlap CO information, the CH information includes a first base station identifier, the first base station identifier is used for identifying a base station with a CH detected by a UE that fails to establish a link, and the CO information includes base station identifiers of at least two base stations with reference signal received power RSRP exceeding a first threshold value among all base stations identified by the UE; a first acquisition unit, configured to, according to the coverage information, acquire statistical information, and acquire a first count, where the first count is the number of all UEs served in the base station, the statistical information includes information related to a coverage hole CH of the base station and/or information related to a coverage overlap CO of the base station; a first sending unit, configured to send the statistical information and the first count acquired by the first acquisition unit to a network coordination controller, so that the network controller establishes at least one coverage cluster according to the statistical information and the first count, learns an entire-network utility value, and determines, according to the entire-network utility value, whether a capacity or coverage weight and an antenna downtilt of each base station in all the coverage clusters need to be adjusted, if the adjustment is needed, acquires an adjustment value for the capacity or coverage weight of each base station and an adjustment value for the antenna downtilt of each base station according to an optimization strategy and sends the adjustment values to a corresponding base station; a second receiving unit, configured to receive the adjustment value for the capacity or coverage weight and the adjustment value for the antenna downtilt that are sent by the network coordination controller; a first determination unit, configured to determine whether the adjustment value for the capacity or coverage weight and the adjustment value for the antenna downtilt are zero; a first adjustment unit, configured to, if neither the adjustment value for the capacity or coverage weight nor the adjustment value for the antenna downtilt is zero, according to the adjustment value for the capacity or coverage weight and the adjustment value for the antenna downtilt, calculate the optimal pilot power; and a second adjustment unit, configured to adjust pilot power of the base station to the calculated optimal pilot power, and adjust a value of the antenna downtilt to the adjustment value for the antenna downtilt, so as to adjust the capacity and coverage of the base station.

A system for optimizing a tradeoff between capacity and coverage of a network includes a network coordination controller and a base station, where the network coordination controller is the foregoing network coordination controller and the base station is the foregoing base station.

The embodiments of the present invention provide a method, a device, and a system for optimizing a tradeoff between capacity and coverage of a network, in which a base station acquires statistical information according to received coverage information reported by a user equipment UE, uses the number of UEs in the base station that is obtained by counting as a first count, and sends the statistical information and the first count to a network coordination controller. After receiving the statistical information and the first count, the network coordination control, establishes a coverage cluster according to the statistical information, calculates a cluster value of the coverage cluster, calculates an entire-network CH value and CO value by using the cluster value, calculates an entire-network utility value, if it is determined, according to the entire-network utility value, that the capacity or coverage weight and the antenna downtilt of the base station need to be adjusted, acquires an adjustment value for capacity or an adjustment value for a coverage weight and an adjustment value for an antenna downtilt of each base station according to an optimization strategy, and sends the adjustment values to a corresponding base station, so that the base station calculates the optimal pilot power according to the value for the capacity or coverage weight and the adjustment value for the antenna downtilt, so as to adjust the capacity and coverage of the base station. Therefore, the network coordination controller adjusts the adjustment value for the capacity or coverage weight of each base station and the adjustment value for the antenna downtilt of each base station according to the capacity and coverage conditions of all base stations, and each base station adjusts the pilot power, so as to maximize the capacity of a base station while guaranteeing the coverage of the base station, and effectively control the coverage hole and coverage overlap performance of the entire network, and as communications only occur between the base station and the network coordination controller and communications between base stations are not required, the signaling exchange load of a system is reduced at the same time.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following descriptions show merely some embodiments of the present invention, and a person of ordinary skill in the art may still derive other drawings from the accompanying drawings without creative efforts.

DETAILED DESCRIPTION

The following clearly describes the technical solutions in the embodiment of the present invention with reference to the accompanying drawings in the embodiments of the present invention. Apparently, the described embodiment is merely a part rather than all of the embodiments of the present invention. All other embodiments acquired by a person of ordinary skill in the art based on the embodiment of the present invention without creative efforts shall fall within the protection scope of the present invention.

Figure 1:
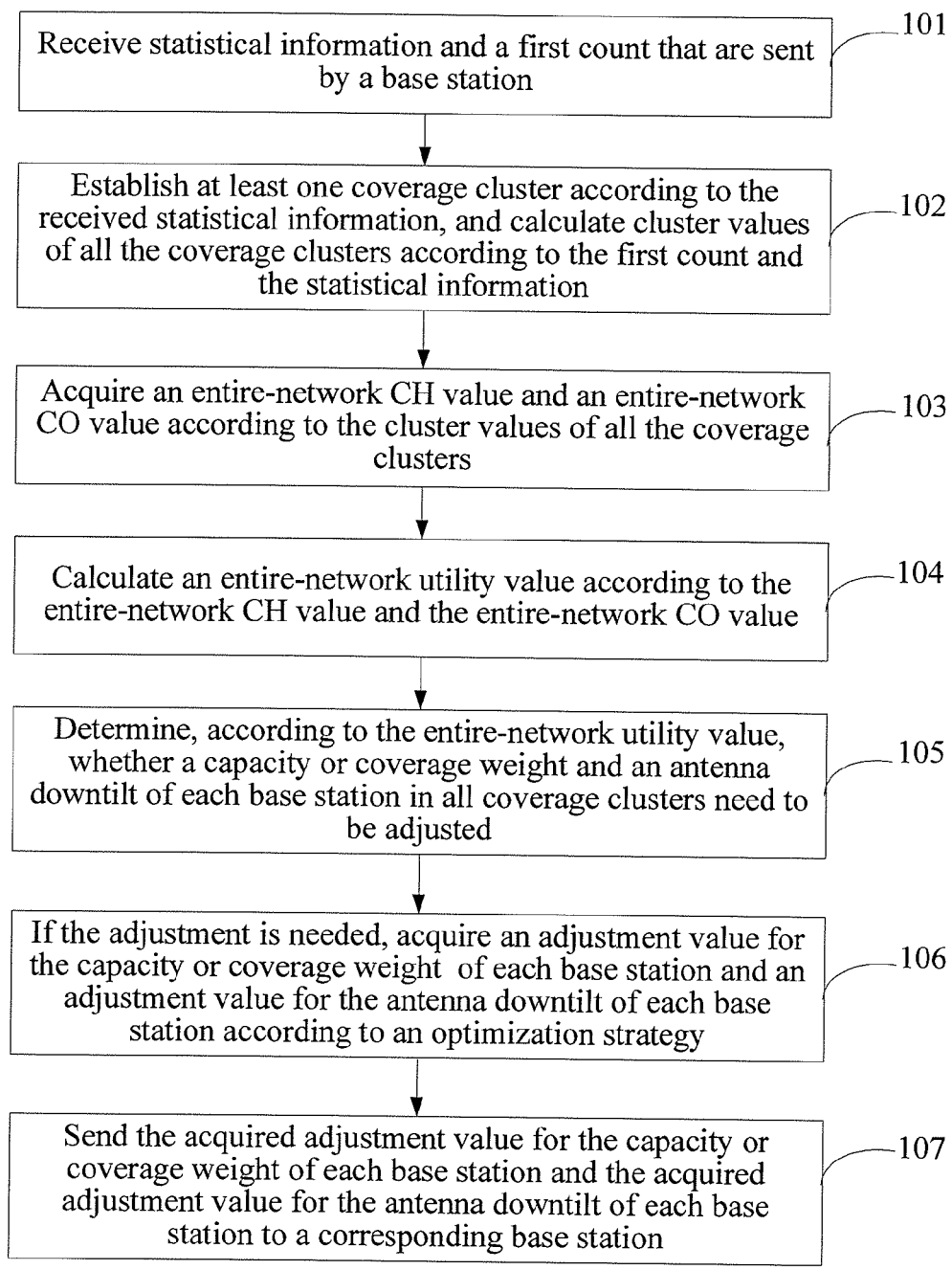
FIG. 1 is a schematic view a method for optimizing a tradeoff between capacity and coverage of a network provided in an embodiment of the present invention.

An embodiment of the present invention provides a method for optimizing a tradeoff between capacity and coverage of a network. As shown in FIG. 1, the method includes:

101. Receive statistical information and a first count that are sent by a base station.

The first count is the number of all user equipments UEs (User Equipments, user equipments) counted by the base station, where the statistical information includes information related to a CH (Coverage Hole, coverage hole) of the base station and/or information related to a CO (Coverage Overlap, coverage overlap) of the base station.

Specifically, if the statistical information includes only CH information, the statistical information includes: the number of UEs in a CH area counted by the base station and a first identifier set formed of at least one base station identifier pair. The base station identifier pair includes a first base station identifier and a second base station identifier, the first base station identifier is used for identifying a base station with a CH detected by a UE that fails to establish a link, the second base station identifier is used for identifying a base station where the UE that fails to establish a link is located after a link is successfully established.

The second base station identifier is the identifier of the base station currently serving the UE.

If the statistical information includes only CO information, the statistical information includes: the number of UEs in a CO area counted by the base station and a second identifier set formed of at least one base station identifier pair. The base station identifier pair includes base station identifiers of at least two base stations with RSRP (Reference signal received power, reference signal received power) exceeding a first threshold value among all base stations identified by the UEs served by the base stations.

It should be noted that the first threshold value is preset by a network coordination controller.

If the statistical information includes CH information and CO information, the statistical information includes: the number of UEs in the CH area, the first identifier set, the number of UEs in the CO area, and the second identifier set.

102. Establish at least one coverage cluster according to the received statistical information, and calculate cluster values of all the coverage clusters according to the first count and the statistical information.

The coverage cluster is used for recording a base station identifier related to the CH or a base station identifier related to the CO.

Figure 2:
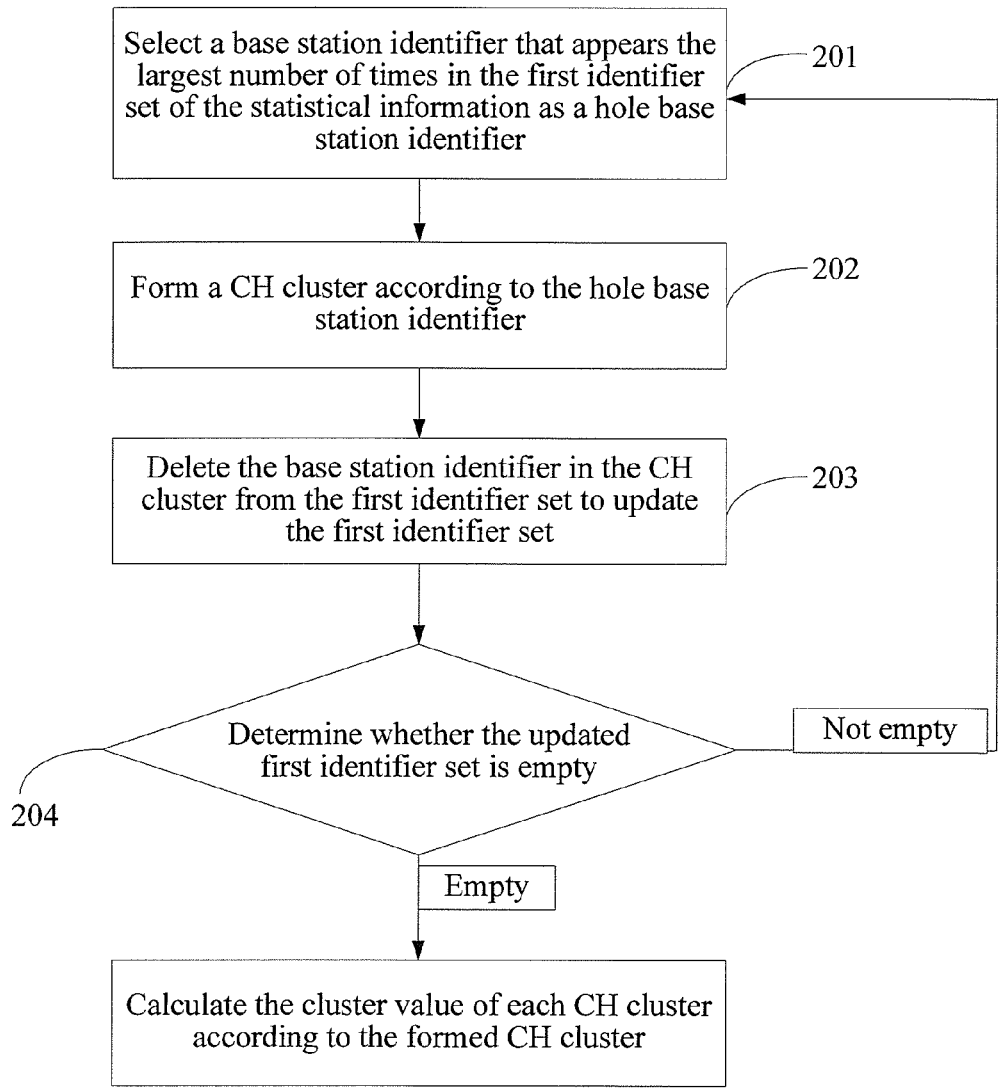
FIG. 2 is a schematic view of a method for forming a coverage hole cluster provided in an embodiment of the present invention.

Specifically, if the statistical information includes CH information, establish at least one coverage cluster according to the received statistical information, which, as shown in FIG. 2, is specifically:

201. Select a base station identifier that appears the largest number of times in the first identifier set of the statistical information as a hole base station identifier.

202. Form a CH cluster according to the hole base station identifier.

Specifically, if at least one first association base station identifier with the number of times of being associated with the hole base station identifier being larger than a second threshold value exists, form the hole base station identifier and the at least one first association base station identifier into one CH cluster.

If at least one first association base station identifier with the number of times of being associated with the hole base station identifier exceeding a second threshold value does not exist, form the hole base station identifier into one CH cluster.

It should be noted that the first base station identifier and the second base station identifier in one base station identifier pair are associated once. The second threshold value is preset by the network coordination controller.

203. Delete the base station identifier in the CH cluster from the first identifier set to update the first identifier set.

204. Determine whether the updated first identifier set is empty; if the first identifier set is not empty, perform step 201; and if the first identifier set is empty, calculate a cluster value of each CH cluster according to the formed CH cluster. At this time, the cluster value is the CH value of each CH cluster.

Specifically, if the first identifier set is empty, in each formed CH cluster, add the number of UEs in the CH area of each base station in the CH cluster according to the number of UEs in a CH area counted by the base station in the statistical information, acquire the number of all UEs in the CH area in the CH cluster, and according to the first count, count all UEs in the CH cluster to obtain the number of all the UEs in the CH cluster according to the first count, and acquire the cluster value of CH cluster according to the number of all UEs in the CH area in the CH cluster and the number of all UEs of the CH cluster.

Furthermore, the formula for calculating the CH value of each CH cluster is:

$$CH_i = \frac{n_{CH,i}}{M_{CH,i}},$$

where CH, denotes a cluster value of the ith CH cluster, i=1, 2, 3, . . . , and k, and k denotes the total number of the formed CH clusters. $M_{CH,i}$ denotes the number of all UEs in the ith CH cluster, and $n_{CH,i}$ denotes the number of UEs in the CH area in the ith CH cluster.

Figure 3:
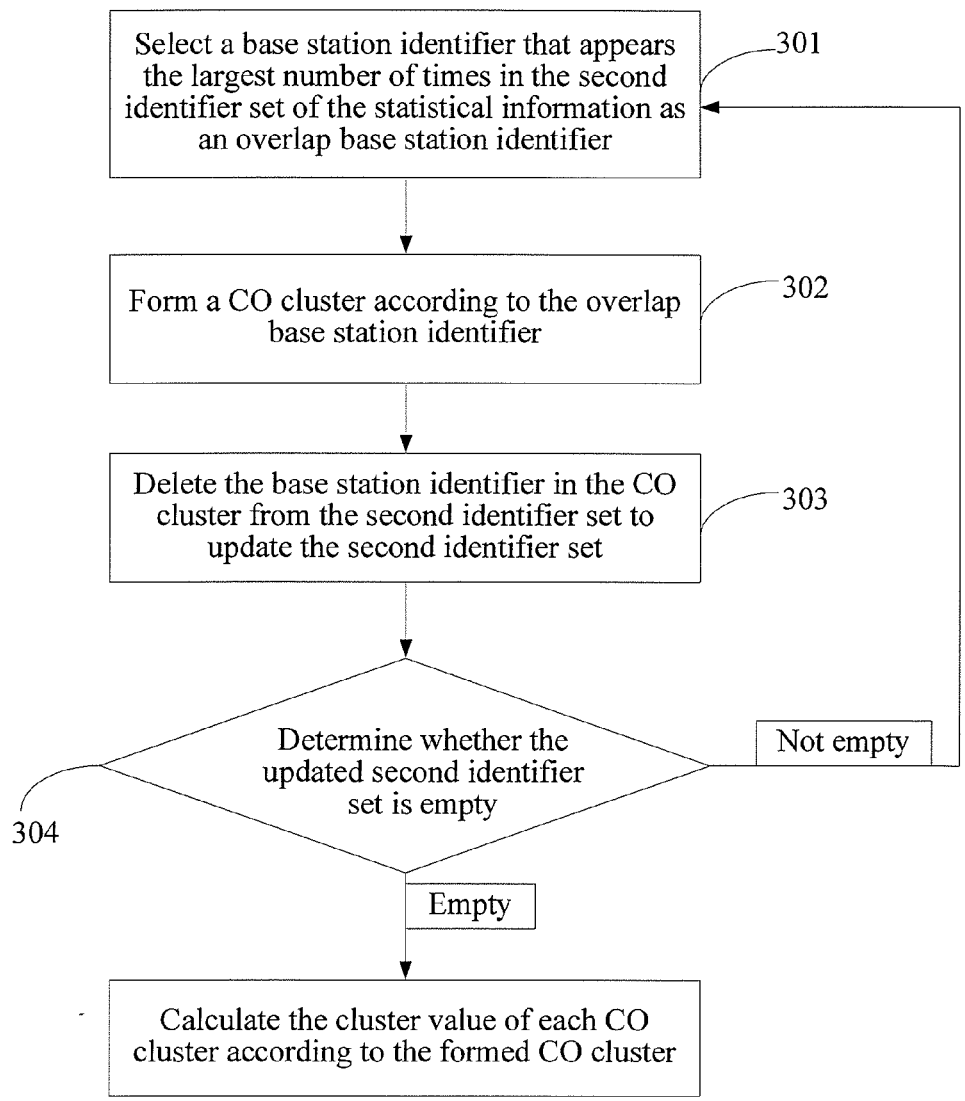
FIG. 3 is a schematic view of a method for forming a coverage overlap cluster provided in an embodiment of the present invention.

If the statistical information includes the CO information, establish at least one coverage cluster according to the received statistical information. As shown in FIG. 3, the establishment is specifically:

301. Select a base station identifier that appears the largest number of times in the second identifier set of the statistical information as an overlap base station identifier.

302. Form a CO cluster according to the overlap base station identifier.

Specifically, if at least one second association base station identifier with the number of times of being associated with the overlap base station identifier exceeding a third threshold value exists, form the overlap base station identifier and the at least one second association base station identifier into one CO cluster.

If at least one second association base station identifier with the number of times of being associated with the overlap base station identifier exceeding a third threshold value does not exist, form the overlap base station identifier into one CO cluster.

It should be noted that among all base stations identified by one UE in the CO area, the base station identifiers of at least two base stations with RSRP exceeding the first threshold value are associated once. The third threshold value is preset by a network coordination controller.

303. Delete the base station identifier in the CO cluster from the second identifier set to update the second identifier set.

304. Determine whether the updated second identifier set is empty, if the second identifier set is not empty, perform step 301; and if the second identifier set is empty, calculate the cluster value of each CO cluster according to the formed CO cluster. At this time, the cluster value is the CO value of each CO cluster.

Specifically, if the second identifier set is empty, in each formed CO cluster, add the number of UEs in the CO area of each base station in the CO cluster according to the number of UEs in a CO area counted by the base station in the statistical information, acquire the number of all UEs in the CO area in the CO cluster. Also, count all UEs in the CO cluster to obtain the number of all the UEs in the CO cluster according to the first count, and acquire the cluster value of the CO cluster according to the number of all UEs in the CO area in the CO cluster and the number of all UEs in the CO cluster.

Furthermore, the formula for calculating the CO value of each CO cluster is:

$$CO_i = \frac{n_{CO,i}}{M_{CO,i}},$$

where, $CO_i$ denotes the cluster value of the ith CO cluster, i=1, 2, 3, . . . , l, and l denotes the total number of the form CO clusters. $M_{CO,i}$ denotes the number of all UEs in the ith CO cluster, and $n_{CO,i}$ denotes the number of all UEs in the CO area of the ith CO cluster.

103. Acquire an entire-network CH value and an entire-network CO value according to the cluster values of all the coverage clusters.

It should be noted that an entire network is a network formed of all base stations, the coverage cluster includes a coverage hole cluster and a coverage overlap cluster, if a base station in the entire network has a coverage hole, establish at least one coverage hole cluster, and if a base station in the entire network has a coverage overlap, establish at least one coverage overlap cluster.

Specifically, by using a cluster value of each CH cluster and a cluster value of each CO cluster calculated in step 102, acquire an entire-network CH value and an entire-network CO value.

Specifically, an entire-network CH value and an entire-network CO value may be acquired in the following manners:

Manner 1: Accumulate a cluster value of each CH cluster to acquire the entire-network CH value, and accumulate a difference value between the cluster value of the CO cluster and a system requirement value to acquire the entire-network CO value.

The calculation formula is: $CH=\Sigma_{i=1}^{k}CH_i$, $|CO-CO_0|=\Sigma_{i=1}^{l}|CO_i-CO_0|$; where, $CO_0$ denotes a coverage overlap requirement value of the system and is used for guaranteeing the handover performance between base stations.

Manner 2: Accumulate the square of the cluster value of each CH cluster and obtain a square root to acquire the entire-network CH value, and accumulate the square of difference values between the cluster value of each CO cluster and the system requirement value and obtain a square root to acquire the entire-network CO value.

The calculation formula is:

$$CH = \sqrt[2]{\sum_{i=1}^{k} CH_i^2}, \text{ and } |CO - CO_0| = \sqrt[2]{\sum_{i=1}^{l} |CO_i - CO_0|^2}.$$

It should be noted that, the manner of acquiring an entire-network CH value and an entire-network CO value by using a cluster value of each CH cluster and a cluster value of each CO cluster is not limited to the foregoing two manners, an entire-network CH value and an entire-network CO value may also be acquired according to a Maxmin rule or a Minmax rule by using a cluster value of each CH cluster and a cluster value of each CO cluster, and of course, an entire-network CH value and an entire-network CO value may also be acquire according to other manners by using a cluster value of each CH cluster and a cluster value of each CO cluster; the present invention is not limited thereto.

It should be noted that, if the received statistical information only has CH information and does not have CO information, the acquired entire-network CO value is zero. If the received statistical information only has CO information and does not have CH information, the acquired entire-network CH value is zero.

104. Calculate an entire-network utility value according to the entire-network CH value and the entire-network CO value.

Specifically, an entire-network utility function may be used to calculate an entire-network utility value. Furthermore, the formula of the entire-network utility function is Fit=$\eta_1 CH^2 + \eta_2 (CO-CO_0)^2$, where Fit denotes the entire-network utility value, $\eta_1$ is the weight of the entire-network CH, $\eta_2$ is the weight of the entire-network CO. $\eta_1$ and $\eta_2$ are preset by the network coordination controller.

105. Determine, according to the entire-network utility value, whether a capacity or coverage weight and an antenna downtilt of each base station in all the coverage clusters need to be adjusted.

Specifically, two conditions need to be determined to determine, according to the entire-network utility value, whether a capacity or coverage weight and an antenna downtilt of a base station in all coverage clusters need to be adjusted.

In a first condition, detect whether the calculated entire-network utility value is larger than a fourth threshold value. If the entire-network utility value is larger than the fourth threshold value, the capacity or coverage weight and the antenna downtilt of each base station in all the coverage clusters do not need to be adjusted.

In a second condition, detect whether a difference value between the entire-network utility value and an entire-network utility value in the previous adjustment process is smaller than a fifth threshold value. If the difference value is smaller than the fifth threshold value, the capacity or coverage weight and the antenna downtilt of each base station in all the coverage clusters do not need to be adjusted.

If either of the two conditions is met, that is, the entire-network utility value is larger than the fourth threshold value, or, the difference value between the entire-network utility value and the entire-network utility value in the previous adjustment process is smaller than the fifth threshold value, the capacity or coverage weight and the antenna downtilt of each base station in all the coverage clusters do not need to be adjusted.

If neither of the two condition is met, that is, the entire-network utility value is not larger than the fourth threshold value, and the difference value between the entire-network utility value and the entire-network utility value in the previous adjustment process is not smaller than the fifth threshold value, the capacity or coverage weight and the antenna downtilt of each base station in all the coverage clusters need to be adjusted.

It should be noted that, both the fourth threshold value and the fifth threshold value are preset by the network coordination controller.

106. If the adjustment is needed, acquire an adjustment value for the capacity or coverage weight of each base station and an adjustment value for the antenna downtilt of each base station according to an optimization strategy.

It should be noted that, in all embodiments of the present invention, the sum of the adjustment value for the capacity weight and the adjustment value for the coverage weight of the base station is 1, so that only one of the adjustment value for the capacity weight and the adjustment value for the coverage weight of the base station needs to be acquired. The calculation of the adjustment value for the capacity weight of the base station is taken as an example for illustration in the following.

Specifically, the optimization strategy includes an algorithm without a modeling function and an algorithm with a modeling function.

The algorithm without a modeling function is specifically as follows:

Determine a preset range at which a cluster value of each coverage cluster is, and learn a maximum adjustment value for a capacity or coverage weight corresponding to the preset range and a maximum adjustment value for an antenna downtilt corresponding to the preset range. The preset range is a range divided from the value range of the cluster value of the coverage cluster in advance.

Acquire the number of neighboring base stations of each base station within the coverage cluster of the base station, and according to the acquired number of neighboring base stations of each base station, the maximum adjustment value for a capacity or coverage weight, and the maximum adjustment value for an antenna downtilt, obtain the adjustment value for the capacity or coverage weight of each base station and the adjustment value for the antenna downtilt of each base station within the coverage cluster.

It should be noted that, the preset range is a range acquired by the network coordination controller by quantizing the coverage according to the value range of coverage in advance. If the coverage is a CH, quantize the value range of the CH to acquire K ranges. K is an integer larger than 0, the value range of CH is [$CH^{mi}$, 1], where $CH^{mi}$ is a proportional value of the minimum CH allowable by the system. If the coverage is a CO, quantize the CO according to the value range of the CO to acquire K1 ranges. K1 is an integer larger than 0, the value range of the CO is [0, $CO_0-\xi_1$], [$CO_0+\xi_2$, 1], $\xi_1$ and $\xi_2$ are the maximum values deviating from the CO0 allowable by the system.

For example, if the coverage cluster is a CH cluster, the weights for the antenna downtilt and the capacity of each base station in all CH clusters include:

quantizing the value range of the CH into K ranges, [$CH^{mi}$, $CH^1$], ($CH^1$, $CH^2$], ($CH^2$, $CH^3$], ..., and ($CH^{K-1}$, 1];

where, $CH^1$, $CH^2$, $CH^3$, ..., and $CH^{K-1}$ are quantized threshold values; $CH^{mi}$ is the proportional value of the minimum CH allowable by the system, and $CH^{mi}$ is larger than 0; $CH^1, CH^2, CH^3, \ldots, CH^{K-1}$ and $CH^{mi}$, are all set in advance;

all ranges correspond to specific antenna downtilts $\Delta tilt_{max}^{CH}[1], \Delta tilt_{max}^{CH}[2], \Delta tilt_{max}^{CH}[3], \ldots,$ and $\Delta tilt_{max}^{CH}[K]$ and capacity weights $\Delta w_{1,max}^{CH}[1], \Delta w_{1,max}^{CH}[2], \Delta w_{1,max}^{CH}[3], \ldots,$ and $\Delta w_{1,max}^{CH}[K]$;

where, $\Delta tilt_{max}^{CH}[1]$ denotes the maximum adjustable value for the antenna downtilt corresponding to the range $[CH^{mi}, CH^1]$, $\Delta w_{1,max}^{CH}[1]$ denotes the maximum adjustable value for the capacity weight corresponding to the range $[CH^{mi}, CH^1]$; the values of $\Delta tilt_{max}^{CH}[1], \Delta tilt_{max}^{CH}[2], \Delta tilt_{max}^{CH}[3], \ldots,$ and $\Delta tilt_{max}^{CH}[K]$ are smaller than 0 and the absolute values thereof increment in sequence; and the values of $\Delta w_{1,max}^{CH}[1], \Delta w_{1,max}^{CH}[2], \Delta w_{1,max}^{CH}[3], \ldots,$ and $\Delta w_{1,max}^{CH}[K]$ are smaller than 0 and the absolute values thereof increment in sequence.

The range at which the cluster value of each CH cluster is may be learned according to the calculated cluster value of each CH cluster, and the maximum adjustable value for the capacity weight corresponding to the range and the maximum adjustable value for the antenna downtilt corresponding to the range are learned.

It should be noted that, if the cluster value of the CH cluster does not belong to any one of the K ranges, set the adjustment value for the antenna downtilt corresponding to this CH cluster to 0, and set the adjustment value for the capacity weight to 0.

Acquire the number of neighboring base stations of each base station within each CH cluster, and according to the acquired number of neighboring base stations of each base station, the maximum adjustment value for an antenna downtilt, and the maximum adjustment value for a capacity weight, obtain the value to be adjusted for the antenna downtilt, the value to be adjusted for the capacity weight, and the value to be adjusted for the coverage weight of each base station within each CH cluster.

If the coverage cluster is a CO cluster, the adjustment of the weights of the antenna downtilt and the capacity of each base station in all CO clusters include:

quantizing the value range of the CO into $K_1$ ranges, $[0, CO^1], (CO^1, CO^2], (CO^2, CO^3], \ldots, (CO^{K1-1}, CO_0-\xi_1], (CO_0+\xi_2, CO^{K1}], (CO^{K1+1}, CO^{K1+2}], \ldots,$ and $(CO^{K1+K2-1}, 1]$.

where, $K_1 = K1+K2$; $CO^1, CO^2, CO^3, \ldots,$ and $CO^{K1+K2-1}$ are quantized threshold values; $CO_0$ is a requirement value set for guaranteeing a handover success rate, and $CO_0$ is larger than 0; $\xi_1$ and $\xi_2$ are specified maximum values deviating from $CO_0$; and $CO^1, CO^2, CO^3, \ldots, CO^{K1+K2-1}, CO_0, \xi_1,$ and $\xi_2$ are set in advance.

The ranges correspond to specific antenna downtilts $\Delta tilt_{max}^{CO}[1], \Delta tilt_{max}^{CO}[2], \Delta tilt_{max}^{CO}[3], \ldots, \Delta tilt_{max}^{CO}[K1], \Delta tilt_{max}^{CO}[K1+1], \ldots,$ and $\Delta tilt_{max}^{CO}[K_1]$ and capacity weights $\Delta w_{1,max}^{CO}[1], \Delta w_{1,max}^{CO}[2], \Delta w_{1,max}^{CO}[3], \ldots, \Delta w_{1,max}^{CO}[K1], \Delta w_{1,max}^{CO}[K1+1], \ldots,$ and $\Delta w_{1,max}^{CO}[K_1]$.

where, when $k \leq K1$, k denotes the kth range, $\Delta tilt_{max}^{CO}[k]$ and $\Delta w_{1,max}^{CO}[k]$ are smaller than 0 and the absolute values thereof decrement in sequence; when $k > K1$, $\Delta tilt_{max}^{CO}[k]$ and $\Delta w_{1,max}^{CO}[k]$ are larger than 0 and the absolute values thereof increment in sequence; $\Delta tilt_{max}^{CO}[1], \Delta tilt_{max}^{CO}[2], \Delta tilt_{max}^{CO}[3], \ldots, \Delta tilt_{max}^{CO}[K1], \Delta tilt_{max}^{CO}[K1+1], \ldots,$ and $\Delta tilt_{max}^{CO}[K_1]$ and $\Delta w_{1,max}^{CO}[1], \Delta w_{1,max}^{CO}[2], \Delta w_{1,max}^{CO}[3], \ldots, \Delta w_{1,max}^{CO}[K1], \Delta w_{1,max}^{CO}[K1+1], \ldots,$ and $\Delta w_{1,max}^{CO}[K_1]$ are all set in advance.

According to the calculated cluster value of each CO cluster, the range at which the cluster value of each CH cluster is may be learned, and the antenna downtilt and capacity weights corresponding to the range are learned.

It should be noted that, if the cluster value of the CO cluster does not belong to any one of the K ranges, set the adjustment value for the antenna downtilt corresponding to the CO cluster to 0, and set the adjustment value for the capacity weight to 0.

Acquire the number of neighboring base stations of each base station within each CO cluster, and according to the acquired number of neighboring base stations of each base station, the maximum adjustment value for the antenna downtilt and the maximum adjustment value for the capacity weight, obtain the value to be adjusted for the antenna downtilt, the value to be adjusted for the capacity weight, and the value to be adjusted for the coverage weight of each base station within each CO cluster.

Furthermore, obtain the adjustment value for the capacity or coverage weight of each base station and the adjustment value for the antenna downtilt of each base station within the coverage cluster according to the acquired number of neighboring base stations of each base station, the maximum adjustment value for the capacity or coverage weight, and the maximum adjustment value for the antenna downtilt, which specifically includes:

According to the formulas $$\Delta tilt_j = \frac{N_j \Delta tilt_{max}}{6} \text{ and } \Delta w_{i,j} = \frac{N_j \Delta w_{l,max}}{6},$$

obtain the adjustment value for the capacity or coverage weight of each base station and the adjustment value for the antenna downtilt of each base station within the coverage cluster. j denotes a sequence number of a base station; $\Delta tilt_j$ denotes an adjustment value for the antenna downtilt of the base station j, $\Delta w_{l,j}$ denotes an adjustment value for the capacity or coverage weight of the base station j, $\Delta w_{l,max}$ denotes the maximum adjustable value for the capacity or coverage weight of the coverage cluster, when $l=1$, $\Delta w_{l,j}$ denotes an adjustment value for the capacity weight of the base station j, $\Delta w_{l,max}$ denotes the maximum adjustable value for the capacity weight of the coverage cluster, when $l=2$, $\Delta w_{l,j}$ denotes an adjustment value for the coverage weight of the base station j, $\Delta w_{l,max}$ denotes the maximum adjustable value for the coverage weight of the coverage cluster, $N_j$ denotes the number of neighboring base stations of the base station j within the coverage cluster; and $\Delta tilt_{max}$ denotes the maximum adjustable value for the antenna downtilt of the coverage cluster.

Exemplarily, by making $l=1$, calculate the adjustment value for the capacity, that is, $$\Delta w_{l,j} = \frac{N_j \Delta w_{l,max}}{6},$$

so the adjustment value for the coverage is $\Delta w_{2,j} = 1 - \Delta w_{l,j}$.

Specifically, the specific calculation formula for the CH cluster is:

$$\Delta tilt_j^{CH} = \frac{N_j^{CH}(tilt)_{max}^{CH}}{6}, \Delta w_{l,j}^{CH} = \frac{N_j^{CH} \Delta w_{l,max}^{CH}}{6};$$

the specific calculation formula for the CO cluster is:

$$\Delta tilt_j^{CO} = \frac{N_j^{CO}(tilt)_{max}^{CO}}{6}, \Delta w_{i,j}^{CO} = \frac{N_j^{CO}\Delta w_{i,max}^{CO}}{6}.$$

If the base station is in both the CH cluster and the CO cluster, the adjustment value for the antenna downtilt thereof is:

$\Delta tilt_j = w_{1,j}\Delta tilt_j^{CH} + w_{2,j}\Delta tilt_j^{CO}, \Delta w_{1,j} = w_{1,j}\Delta w_{1,j}\Delta w_{1,j}^{CH} + w_{2,j}\Delta w_{1,j}^{CO}$, where $w_{1,j}$ denotes the weight capacity of the base station j, and $w_{2,j}$ denotes the coverage weight of the base station j.

It should be noted that, for the algorithm without a modeling function in the present invention, a network coordination controller may use a heuristic algorithm to acquire the adjustment value for the capacity or coverage weight of each base station and an adjustment value for the antenna downtilt of each base station, and of course, the network coordination controller may also use other algorithms to acquire the value for the capacity or coverage weight of each base station and the adjustment value for the antenna downtilt of each base station; the present invention is not limited thereto.

The algorithm with a modeling function is specifically as follows:

If a current adjustment is any adjustment other than the first adjustment, the calculating the adjustment value for the capacity or coverage weight of each base station and the adjustment value for the antenna downtilt of each base station in the any adjustment includes:

According to a preset modeling function, calculate a value of each independent variable minimizing the dependent variable of the modeling function within the preset condition.

The modeling function is a functional relationship with a dependent variable, an independent variable, and a coefficient. Each independent variable denotes the capacity or coverage weight and antenna downtilt of each base station in the entire network. The dependent variable denotes an entire-network CH or an entire-network CO. The coefficient denotes a minimum error correlation value between a minimum value of the dependent variable after the previous adjustment and an entire-network CH value or an entire-network CO value acquired in the previous adjustment. The preset condition is a range of the independent variable during the calculation of the minimum value of the dependent variable.

Specifically, according to the preset modeling function, a value of each independent variable minimizing the dependent variable of the modeling function is calculated according to the preset condition. The current minimum dependent variable is also calculated. The coefficient in the modeling function is updated according to the direct minimum error correlation value of the minimum dependent variable calculated the current time and the entire-network CH value or entire-network CO value acquired in the current adjustment, so that the modeling function with the updated coefficient is used next time. Of course, after the minimum dependent variable is calculated in this time, the coefficient of the modeling function may also be not updated; instead, before the modeling function is used next time, the coefficient of the modeling function is first updated by using the minimum error correlation value between the minimum value of the dependent variable after the previous adjustment and an entire-network CH value or entire-network CO value acquired during the previous adjustment, and then the modeling function with the updated coefficient is used to calculate a value of each independent variable minimizing the dependent variable of the modeling function within the preset condition.

If the current adjustment is the first adjustment, according to the preset modeling function, the dependent variable and the coefficient are calculated according to a preset value of each independent variable.

Specifically, if the current adjustment is the first adjustment, preset the form of the modeling function, and preset the values of a plurality of independent variables, so as to calculate the dependent variable and coefficient of the modeling function.

It should be noted that, the presetting the form of the modeling function refers to that the modeling function may be set to a linear form or a exponential form or a square form of an independent variable, and may also be set to other forms, which is not limited in the present invention.

107. Send the acquired adjustment value for the capacity or coverage weight of each base station and the acquired adjustment value for the antenna downtilt of each base station to a corresponding base station, so that the base station calculates the optimal pilot power.

Specifically, the network coordination controller sends the acquired adjustment value for the capacity or coverage weight of each base station and the acquired adjustment value for the antenna downtilt of each base station to a corresponding base station, so that the base station calculates the optimal pilot power according to the adjustment value for the capacity or coverage weight and the adjustment value for the antenna downtilt, and performs adjustment according to the pilot power, so as to maximize the capacity of the base station while guaranteeing the coverage of the base station.

It should be noted that, the base station calculates the pilot power according to two algorithms. The two algorithms include an algorithm with a modeling function and an algorithm without a modeling function. For the algorithm with a modeling function, the base station may optimize a local utility value according to this algorithm to calculate the pilot power, and the pilot power is the optimal pilot power. For the algorithm without a modeling function, the base station may acquire at least one local utility value according to the algorithm, select the optimal local utility value from the at least one local utility value, and acquire the corresponding optimal pilot power according to the optimal local utility value.

The embodiment of the present invention provides a method for optimizing a tradeoff between capacity and coverage of a network, a network coordination control, after receiving statistical information and a first count that are sent by a base station, establishes a coverage cluster according to the statistical information, calculates a cluster value of the coverage cluster according to the statistical information and the first count, uses the cluster value to calculate an entire-network coverage hole CH value and an entire-network coverage overlap CO value, and calculates an entire-network utility value, if it is determined, according to the entire-network utility value, that the capacity or coverage weight and the antenna downtilt of the base station need to be adjusted, acquires an adjustment value for the capacity or coverage weight of each base station and an adjustment value for the antenna downtilt of each base station according to an optimization strategy, and sends the adjustment values to a corresponding base station, so that the base station calculates the optimal pilot power according to the adjustment value for the capacity or coverage weight and the adjustment value for the antenna downtilt, so as to adjust the capacity and coverage of the base station. Therefore, the network coordination controller adjusts the adjustment value for the capacity or coverage weight of each base station and the adjustment value for the antenna downtilt of each base station according to the capacity and coverage conditions of all base stations, and each base station adjusts the pilot power, so as to maximize the capacity of a base station while guaranteeing the coverage of the base station, and effectively control the coverage hole and coverage overlap performance of the entire network, and as communications only occur between the base station and the network coordination controller and communications between base stations are not required, the signaling exchange load of a system is reduced at the same time.

Figure 4:
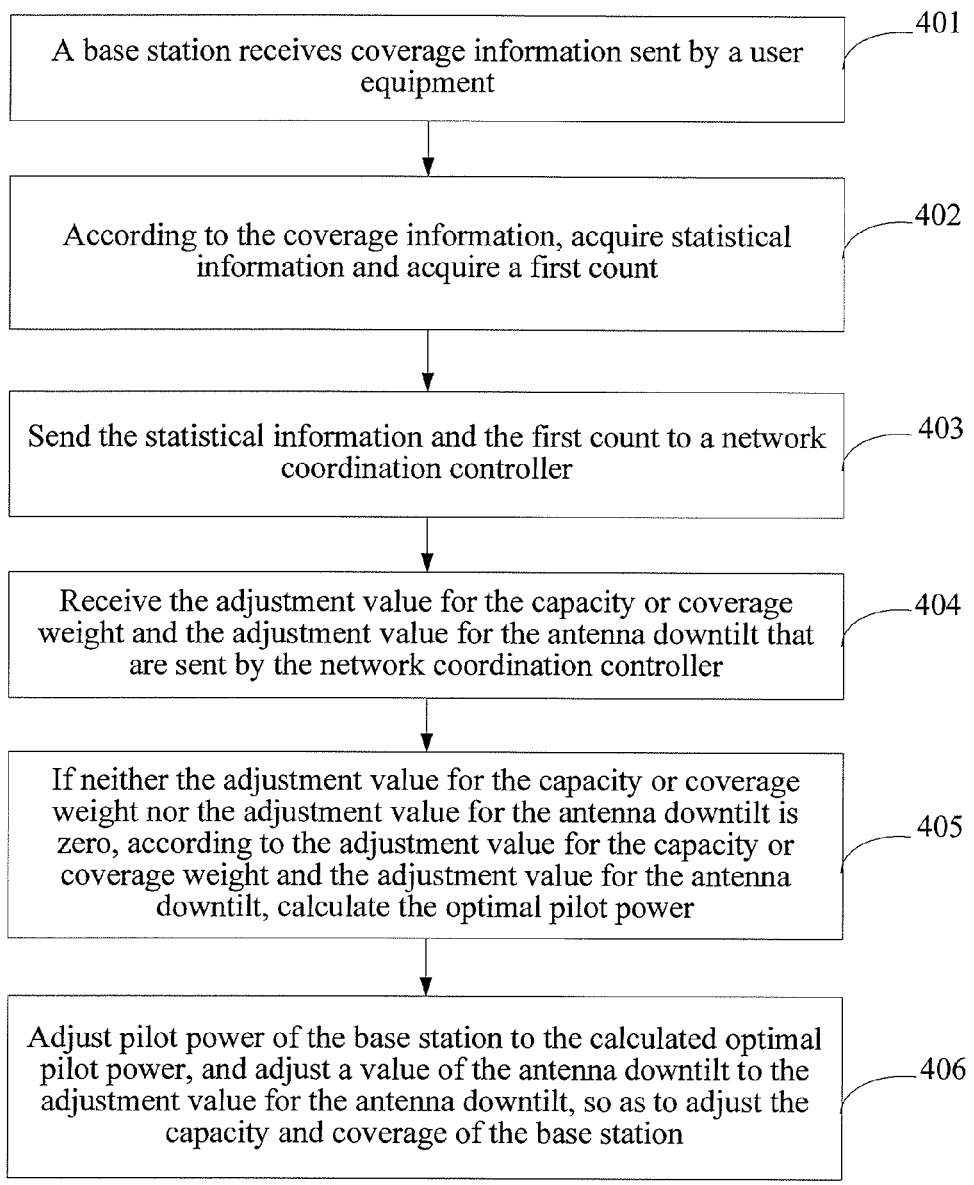
FIG. 4 is a schematic view of another method for optimizing a tradeoff between capacity and coverage of a network provided in an embodiment of the present invention.

An embodiment of the present invention further provides a method for optimizing a tradeoff between capacity and coverage of a network, which, as shown in FIG. 4, includes:

401. A base station receives coverage information sent by a UE (User Equipment, user equipment).

The coverage information includes CH (Coverage Hole, coverage hole) information and/or coverage overlap CO (Coverage Overlap, coverage overlap) information. The CH information includes a first base station identifier, the first base station identifier is used for identifying a base station with a CH detected by a UE that fails to establish a link; the CO information includes base station identifiers of at least two base stations with reference signal received power RSRP exceeding a first threshold value among all base stations identified by the UE.

402. According to the coverage information, acquire statistical information and acquire a first count.

Specifically, if the coverage information reported by the UE and received by the base station only has CH information, the statistical information includes only CH information related to the base station, which specifically includes: the number of UEs in a CH area and a first identifier set formed of at least one base station identifier pair. The acquiring the statistical information according to the coverage information is specifically as follows: the base station counts UEs that send the CH information to obtain the number of the UEs that send the CH information, uses the number of the UEs that send the CH information as the number of UEs in the CH area, acquires the base station identifier pair according to the CH information, and forms the at least one base station identifier pair into the first identifier set.

The base station identifier pair includes the first base station identifier and the second base station identifier; the second base station identifier is used for identifying a base station where the UE that fails to establish a link is located after a link is successfully established.

It should be noted that the second base station identifier is the identifier of the base station currently serving the UE.

The base station, after receiving the CH information sent by the UE, learns the first base station identifier reported by the UE. The base station forms the first identifier and the base station identifier of the current base station into a base station identifier pair, and forms all base station identifier pairs formed of the first base station identifier reported by the UE served by the base station and the base station identifier of the current base station into a first identifier set.

If the coverage information sent by the UE received by the base station includes only CO information, the statistical information includes only information related to a CO of the base station, which specifically includes: the number of UEs in a CO area and a second identifier set formed of at least one base station identifier pair. The acquiring the statistical information according to the coverage information is specifically as follows: the base station counts UEs that send the CO information to obtain the number of the UEs that send the CO information, uses the number of the UEs that send the CO information as the number of UEs in the CO area, according to the CO information, acquires base station identifiers of at least two base stations with reference signal received power RSRP exceeding a first threshold value among all base stations identified by the UE, forms the acquired base station identifiers of the at least two base stations into a base station identifier pair, and forms at least one base station identifier pair into a second identifier set.

The base station, after receiving the CO information sent by the UE, learns the base station identifier of the base station with a CO. As the base station may acquire base station identifiers of at least two base stations from the CO information sent by each UE, the base station forms the base station identifier of the base station with a CO reported by each UE into a base station identifier pair, and forms all base station identifier pairs into a second identifier set.

If the coverage information sent by the UE and received by the base station includes CH information and CO information, the statistical information includes information related to a CH and information related to a CO of the base station, which specifically include: the number of UEs in the CH area, the first identifier set, the number of UEs in the CO area, and the second identifier set. The acquiring the statistical information according to the coverage information is specifically as follows: the base station counts UEs that send the CH information to obtain the number of the UEs that send the CH information, uses the number of the UEs that send the CH information as the number of UEs in the CH area, acquires the base station identifier pair according to the CH information, and forms at least one base station identifier pair into the first identifier set; the base station counts UEs that send the CO information to obtain the number of the UEs that send the CO information, uses the number of the UEs that send the CO information as the number of UEs in the CO area, according to the CO information, acquires the base station identifiers of at least two base stations with reference signal received power RSRP exceeding a first threshold value among all base stations identified by the UEs in the CO area, forms the acquired base station identifiers of at least two base stations into a base station identifier pair, and forms the at least one base station identifier pair into a second identifier set.

403. Send the statistical information and the first count to a network coordination controller, respectively, so that the network controller establishes at least one coverage cluster according to the statistical information and the first count, learns an entire-network utility value, and determines, according to the entire-network utility value, whether a capacity or coverage weight and an antenna downtilt of each base station in all the coverage clusters need to be adjusted, if the adjustment is needed, acquires an adjustment value for the capacity or coverage weight of each base station and an adjustment value for the antenna downtilt of each base station according to an optimization strategy and sends the adjustment values to a corresponding base station.

The first count is the number of all UEs served in the base station. The statistical information includes information related to a coverage hole CH of the base station and/or information related to a coverage overlap CO of the base station.

404. Receive the adjustment value for the capacity or coverage weight and the adjustment value for the antenna downtilt that are sent by the network coordination controller.

405. If neither the adjustment value for the capacity or coverage weight nor the adjustment value for the antenna downtilt is zero, according to the adjustment value for the capacity or coverage weight and the adjustment value for the antenna downtilt, calculate the optimal pilot power.

Specifically, if the adjustment value for the capacity or coverage weight and the adjustment value for the antenna downtilt are both zero, the base station does not perform any adjustment.

If neither the adjustment value for the capacity or coverage weight nor the adjustment value for the antenna downtilt is zero, according to the adjustment value for the capacity or coverage weight and the adjustment value for the antenna downtilt, calculate the optimal pilot power. The method for calculating the pilot power includes an algorithm with a modeling function and an algorithm without a modeling function.

For the algorithm with a modeling function, the calculation process is specifically as follows:

Use the formula $p_j = \max(w_{1,j}^L Cap_j + w_{2,j}^L Cov_j)$ to calculate the optimal pilot power.

$p_j$ denotes the pilot power of the base station j, $p_j$ is larger than zero and is smaller than the limit value of a hardware system of a base station, j denotes a sequence number of a base station, and j is an integer, $w_{1,j}^L$ denotes a capacity weight, $w_{2,j}^L$ denotes a coverage weight; L denotes the local (local) and denotes a capacity weight and the coverage weight of the base station j; $Cap_j$ denotes an average spectral efficiency of the base station j, the calculation formula of $Cap_j$ is:

$$Cap_j = \frac{\sum_{k=1}^{K_j} \log(1 + SINR_{j,k})}{K_j},$$

$K_j$ denotes a total number of users of the base station j; $Cov_j$ denotes a spectral efficiency of a % of users with the worst signal among all users in the base station j, a value range of a is (0, 100], the calculation formula of $Cov_j$ is: $Cov_j$=quantile $(\log(1+SINR_{j,k}), a\%)$; $SINR_{j,k}$ is a reference signal of the kth user of the base station j, k=1, 2, 3, ..., $K_j$, denoting the 1st user, 2nd user, 3rd user, ..., and $K_j$th user of the base station j;

$$SINR_{j,k} = \frac{p_j h_{j,k}}{\sigma^2 + \sum_{d \in I_j} p_d h_{d,k}},$$

d denotes an identifier of a neighboring base station that interferes with the base station j; $I_j$ is a set of base station identifiers of all interference neighboring cell base stations; $p_d$ denotes pilot power of the interference neighboring cell base station, $h_{d,k}$ denotes a channel gain of the interference neighboring cell base station d to the kth user of the base station j, $h_{j,k}$ denotes a channel gain of the kth user of the base station j, $h_{j,k} = PL_{j,d}(d1) \cdot SF_{j,k} \cdot G_{j,k}(\phi,\theta)$, $PL_{j,d}(d1)$ denotes the transmission path loss of the kth user of the base station j related to a distance d1, $SF_{j,k}$ denotes shadow fading of the kth user of the base station j, and $G_{j,k}(\phi,\theta)$ denotes an antenna gain that combines an azimuth and an angle elevation of the kth user of the base station j.

Furthermore, $PL_{j,d}(d1) = A + B \cdot \log(d1)$, and the unit is dB. d1 identifies the distance between the UE and the base station, the unit is kilometer, and A and B are path loss parameters.

For example, the typical values of A and B are shown in the following table.

| Path | Line of Sight | Non-line of Sight |
|---|---|---|
| Base station →UE | A = 103.4; B = 24.2 | A = 131.1; B = 42.8 |

The calculation formula of the antenna gain is: $G_{j,k}(\phi,\theta) = -\min\{-[G_H(\phi)+G_V(\theta)], G_m\}$, where $G_H(\phi)$ denotes a horizontal antenna mode, and the calculation formula is:

$$G_H(\varphi) = -\min\left\{12\left(\frac{\varphi}{\varphi_{3dB}}\right)^2, G_m\right\},$$

where $\phi_{3dB}$ denotes horizontal half-power wave beam width, $\phi_{3dB}=70°$, $G_m$ denotes a front-to-back ratio, $\phi$ denotes the horizontal azimuth between the UE and the base station, $G_m=25$ dB, $G_V(\theta)$ denotes a vertical antenna mode, the calculation formula is:

$$G_V(\theta) = -\min\left\{12\left(\frac{\theta - \theta_{\theta tilt}}{\theta_{3dB}}\right)^2, SLL_V\right\},$$

where, $\theta_{3dB}$ denotes a vertical half-power wave beam width, $\theta_{3dB}=10°$, $SLL_V$ denotes the minimum side lobe fading, $SLL_V=20$ dB, $\theta_{\theta tilt}$ denotes the downtilt of an electric tilt antenna and is the adjustment value for the antenna downtilt sent by the network coordination controller. During the first calculation, $\theta_{\theta tilt}=15°$ and $\theta$ denotes the vertical azimuth between the UE and the base station.

As can be seen according to the formulas of capacity and coverage of the base station, the formulas of the capacity and coverage of the base station are both the functions of the pilot power of the base station, so that the base station may calculate the optimal pilot power of the base station according to the formula $p_j = \max(w_{1,j}^L Cap_j + w_{2,j}^L Cov_j)$.

For the algorithm without a modeling function, the calculation process is specifically as follows:

According to the pilot power of a first pilot power tree in a first pilot power tree set, acquire a first local utility value corresponding to the first pilot power tree.

Specifically, adjust the pilot power of the base station according to the pilot power of the first pilot power tree in the first pilot power tree set, monitor the values of capacity and coverage after each pilot power adjustment, and according to the monitored values of the capacity and coverage, the value of the capacity weight and the value of the coverage weight, calculate the first local utility value after each pilot power adjustment.

According to all the acquired first local utility values, select a first pilot power tree from the first pilot power trees as a second pilot power tree, acquire the second local utility value corresponding to the second pilot power tree, and form the at least one second pilot power tree into second pilot power tree set. The number of the selected first pilot power trees is equal to the first preset value.

Specifically, select the optimal first local utility value from all first local utility values cyclically, select the first pilot power tree corresponding to the optimal first local utility value from the first pilot power tree set as the second pilot power tree, use the optimal first local utility value as the second local utility value, delete the selected first pilot power tree from the first pilot power tree set, and until the cycle number becomes equal to the first preset value, end the cycle. Form the acquired at least one second pilot power tree into a second pilot power tree set.

Exemplarily, the first preset value is 3 and 6 first pilot power trees in the first pilot power tree set are a, b, c, d, e, and f, respectively. The first local utility values corresponding to the 6 first pilot power trees a, b, c, d, e, and f are 1, 2, 3, 4, 5, and 6.

First, select the optimal first local utility value, for example, 6, from the 6 first local utility values 1, 2, 3, 4, 5, and 6, select the first pilot power tree f corresponding to the optimal first local utility value 6 from the 6 first pilot power trees a, b, c, d, e, and f in the first pilot power tree set as the second pilot power tree, use the optimal first local utility value 6 as the second local utility value, and delete the selected first pilot power tree f from the first pilot power tree set; at this time, the first pilot power trees in the first pilot power tree set are a, b, c, d, and e. At this time, as the cycle number is 1 and the cycle number is not equal to the first preset value, continue selecting the optimal first local utility value from the first local utility value. At this time, select the optimal first local utility value 5, select the first pilot power tree e corresponding to the optimal first local utility value 5 from the first pilot power tree set as the second pilot power tree, use the optimal first local utility value 5 as the second local utility value, and delete the selected first pilot power tree e from the first pilot power tree set; at this time, the first pilot power trees in the first pilot power tree set are a, b, c, and d. At this time, as the cycle number is 2 and the cycle number is not equal to the first preset value, continue selecting the optimal first local utility value from the first local utility value. At this time, select the optimal first local utility value 4, select the first pilot power tree d corresponding to the optimal first local utility value 4 from the first pilot power tree set as the second pilot power tree, use the optimal first local utility value 4 as the second local utility value, and delete the selected first pilot power tree d from the first pilot power tree set; at this time, the first pilot power trees in the first pilot power tree set are a, b, and c.

Use the 3 selected first pilot power trees corresponding to the optimal first local utility values as the second pilot power trees. At this time, as the cycle number is 3 and the cycle number is equal to the first preset value, end the cycle. Form the 3 acquired second pilot power trees into a second pilot power tree set.

The first pilot power tree is preset; form the first pilot power trees into a first pilot power tree set, and the number of the first pilot power trees in the first pilot power tree set is larger than or equal to the first preset value. The first preset value is the number of pieces of pilot power that needs to be calculated preset by the base station.

Specifically, the base station needs to initialize the algorithm for generating a pilot power tree during the current adjustment, which includes: the initialization and generation of the number of pieces of pilot power that needs to be calculated; the initialization of the depth of a pilot power tree; and the method for generating a pilot power tree.

It should be noted that the initialization of the algorithm for generating a pilot power tree refers to that the base station sets an algorithm for generating a pilot power tree in advance.

If the algorithm for generating a pilot power tree initialized during the current adjustment and the algorithm for generating a pilot power tree initialized during the previous adjustment are identical, exemplarily, the first pilot power tree may be the pilot power tree recorded by the base station during the previous adjustment of pilot power, and at this time, the number of the first pilot power trees is the same as the first preset value, select all first pilot power trees as the second pilot power trees, and form the second pilot power trees into a second pilot power tree set.

If the algorithm for generating a pilot power tree initialized during the current adjustment and the algorithm for generating a pilot power tree initialized during the previous adjustment are not identical, the first pilot power tree is preset by the base station according to the algorithm. At this time, the number of the generated first pilot power trees needs to be larger than or equal to the first preset value.

If the number of the generated first pilot power trees is larger than the first preset value, according to the pilot power of the first pilot power tree in the first pilot power tree set, acquire the first local utility value corresponding to the first pilot power tree. According to all the acquired first local utility values, select a first pilot power tree from the first pilot power trees as a second pilot power tree, acquire the second local utility value corresponding to the second pilot power tree, and form the at least one second pilot power tree into a second pilot power tree set. The number of the selected first pilot power trees is equal to the first preset value.

If the number of the generated first pilot power trees is equal to the first preset value, select all the first pilot power trees as the second pilot power trees, and form the second pilot power trees into a second pilot power tree set.

It should be noted that the pilot power tree refers to that the leaf node of the tree bears the value or adjustment value of the pilot power of the base station. The algorithm for generating a pilot power tree may be a generation algorithm of directly generating a full pilot power tree or a generation algorithm of slow generation according to the depth of a tree or a combination of the two; the present invention is not limited thereto.

Perform a genetic operation on the second pilot power tree in the second pilot power tree set cyclically to acquire a third pilot power tree, acquire the third local utility value corresponding to the third pilot power, and form the third pilot power tree into a third pilot power tree set.

Specifically, the base station adjusts the pilot power of the base station according to the pilot power of the third pilot power tree in the third pilot power tree set, monitors the values of capacity and coverage after each pilot power adjustment, and according to the monitored values of the capacity and coverage, the adjustment value for the capacity weight and the adjustment value for the coverage weight, calculate the third local utility value after each pilot power adjustment.

Select a pilot power tree, from the second pilot power tree set according to all the second local utility values and third local utility values, or from the third pilot power tree set according to the third local utility values, use the selected pilot power tree to update the second pilot power tree in the second pilot power tree set, and acquire the second local utility value corresponding to the updated second pilot power tree in the second pilot power tree set. The number of the pilot power trees is equal to the first preset value.

It should be noted that, two methods are provided for the base station to update the second pilot power tree: one is a method based on a local utility function and the other is an algebra based method. In the method based on a local utility function, the base station selects pilot power trees whose number is equal to the first preset value from the second pilot power tree set and the third pilot power tree set according to the second local utility values and the third local utility values. In the algebra-based method, the base station selects pilot power trees whose number is equal to the first preset value from the third pilot power tree set according to the third local utility values.

Specifically, if the base station adopts the method based on a local utility function to update the second pilot power tree, select the optimal local utility value from all the second local utility values and third local utility values cyclically, select the pilot power tree corresponding to the optimal local utility value from the second pilot power tree set and the third pilot power tree set, record the pilot power tree, record the local utility value corresponding to the pilot power tree, delete the selected pilot power tree from the second pilot power tree set and the third pilot power tree set, and until the cycle number is equal to the first preset value, end the cycle. Use the acquired at least one pilot power tree to update the second pilot power tree in the second pilot power tree set, and use the local utility value corresponding to the at least one pilot power tree as the second local utility value corresponding to the updated second pilot power tree in the second pilot power tree set.

If the base station adopts the algebra based method to update the second pilot power tree, select the optimal local utility value from all the third local utility values, select the pilot power tree corresponding to the optimal local utility value from the third pilot power tree set, record the pilot power tree, record the local utility value corresponding to the pilot power tree, delete the selected pilot power tree from the third pilot power tree set, and until the cycle number is equal to the first preset value, end the cycle. Use the acquired at least one pilot power tree to update the second pilot power tree in the second pilot power tree set, and use the local utility value corresponding to the at least one pilot power tree as the second local utility value corresponding to the updated second pilot power tree in the second pilot power tree set.

Acquire the optimal local utility value from the updated second local utility values, which ends when the difference value between the two times of optimal local utility values is smaller than a sixth threshold value or the value of the cycle number reaches a preset value, find the optimal second pilot power tree corresponding to the optimal local utility value according to the optimal local utility value acquired the current time, and acquire the optimal pilot power from the optimal second pilot power tree.

The difference value between the two times of optimal local utility values refers to the difference value between the optimal local utility value acquired the current time and the optimal local utility value acquired after the previous adjustment.

It should be noted that, the genetic operation refers to that an even number of second pilot power trees in a second pilot power tree set are combined two by two; alternatively, a node in one second pilot power tree in the second pilot power tree set has changed, that is, self-mutation occurs; alternatively, the second pilot power tree in the second pilot power tree set keeps unchanged.

It should be noted that, the two-by-two combination of an even number of second pilot power trees in the second pilot power tree set may be to exchange root branches of two trees with each other, or only to exchange leaf nodes of two trees, or to exchange other parts of two trees, which is not limited in the present invention.

Figure 5:
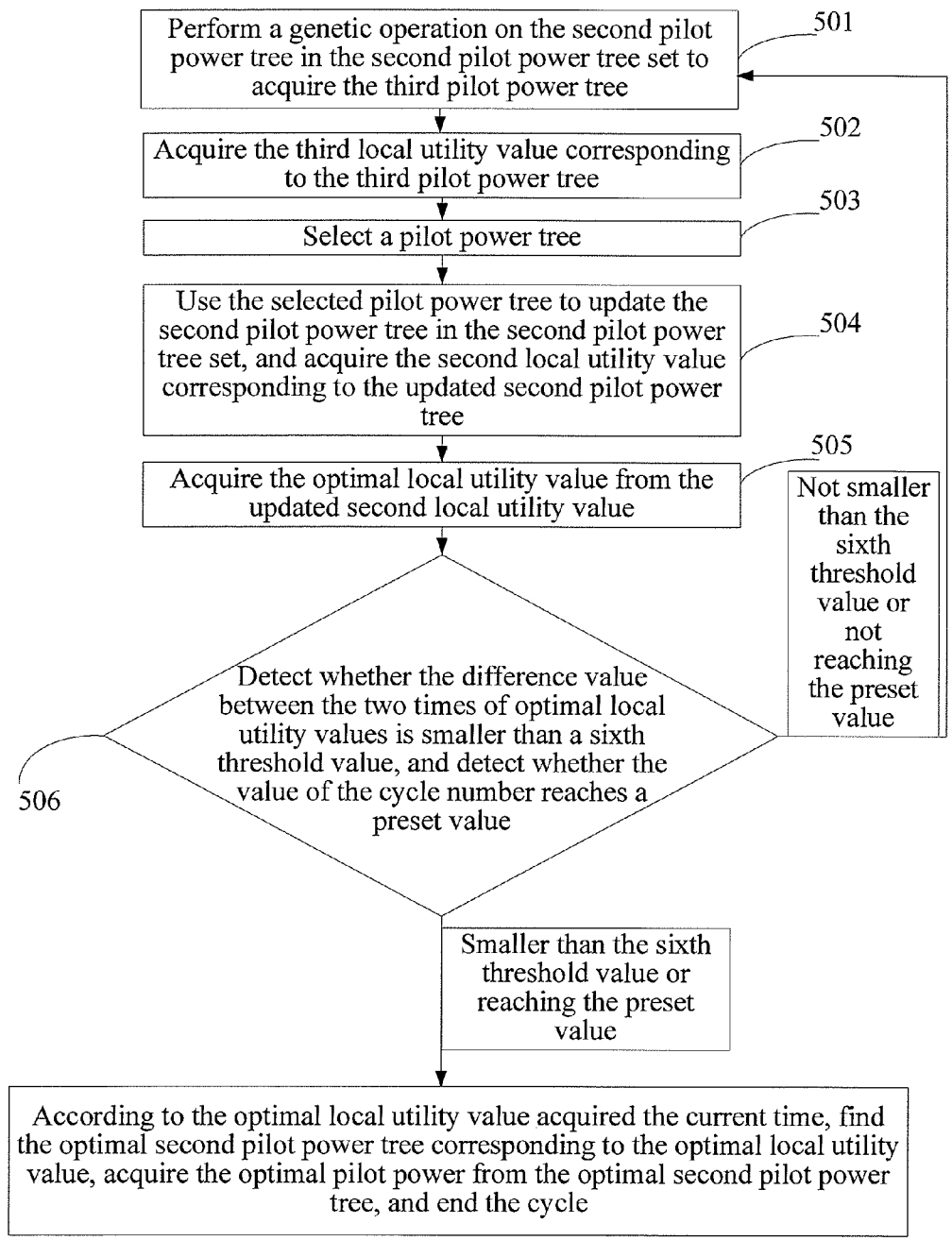
FIG. 5 is a schematic view of yet another method for optimizing a tradeoff between capacity and coverage of a network provided in an embodiment of the present invention.

Specifically, the process of acquiring optimal pilot power is shown in FIG. 5 as follows:

501. Perform a genetic operation on the second pilot power tree in the second pilot power tree set to acquire the third pilot power tree, and faun the third pilot power tree into the third pilot power tree set.

Specifically, the base station, in a 90% probability, selects an even number of second pilot power trees from the second pilot power tree set to perform two-by-two combination of a genetic operation to acquire a third pilot power tree, in a 1% probability, performs self-mutation on the second pilot power tree in the second pilot power tree set to acquire the third pilot power tree, and in a 9% probability, selects the second pilot power tree in the second pilot power tree set as the third pilot power tree without any change. Form the acquired third pilot power tree into a third pilot power tree set.

As the second pilot power tree is selected from the first pilot power tree set, according to the first utility value corresponding to the first pilot power tree selected as the second pilot power tree, learn the second local utility value of the second pilot power tree in the second pilot power tree set, and select an even number of second pilot power trees according to the second local utility value of the second pilot power tree to perform two-by-two combination of a genetic operation.

It should be noted that, if the number of second pilot power trees in the second pilot power tree set is an even number, all the second pilot power trees in the second pilot power tree set may be selected to perform the two-by-two combination.

502. Acquire the third local utility value corresponding to the third pilot power.

Specifically, the base station adjusts the pilot power of the base station according to the pilot power of the third pilot power tree in the third pilot power tree set, monitors the values of capacity and coverage each pilot power adjustment, and according to the monitored values of capacity and coverage, the value of the capacity weight, and the value of the coverage weight, calculate the third local utility value after each pilot power adjustment.

503. Select a pilot power tree, from the second pilot power tree set and the third pilot power tree set according to all the second local utility values and third local utility values, or from the third pilot power tree set according to the third local utility values.

The number of the pilot power trees is equal to the first preset value. The number of the second pilot power trees in the second pilot power tree set is equal to the first preset value.

504. Use the selected pilot power tree to update the second pilot power tree in the second pilot power tree set, and acquire the second local utility value corresponding to the updated second pilot power tree in the second pilot power tree set.

Specifically, replace all second pilot power trees in the second pilot power tree set as the selected pilot power trees, update the second pilot power tree set, and acquire the local utility value corresponding to the selected pilot power tree as the second local utility value corresponding to the updated second pilot power tree in the second pilot power tree set.

505. Acquire the optimal local utility value from the updated second local utility value.

Specifically, select the optimal local utility value from the second local utility values corresponding to the updated second pilot power trees in the second pilot power tree set.

506. Detect whether the difference value between the two times of optimal local utility values is smaller than a sixth threshold value, and detect whether the value of the cycle number reaches a preset value.

The difference value between the two times of optimal local utility values is the difference value between the optimal local utility value acquired the current time and the optimal local utility value acquired after the previous adjustment.

Specifically, if it is detected that the difference value between the optimal local utility value and the optimal local utility value acquired after the previous adjustment is smaller than the sixth threshold value, or it is detected that the value of the cycle number reaches a preset value, end the cycle, according to the optimal local utility value acquired the current time, find the optimal second pilot power tree corresponding to the optimal local utility value, and acquire the optimal pilot power from the optimal second pilot power tree.

If it is detected that the difference value between the optimal local utility value and the optimal local utility value acquired after the previous adjustment is not smaller than the sixth threshold value and it is detected that the value of the cycle number does not reach a preset value, perform step 501.

406. Adjust pilot power of the base station to the calculated optimal pilot power, and adjust a value of the antenna downtilt to the adjustment value for the antenna downtilt, so as to adjust the capacity and coverage of the base station.

Specifically, the base station adjusts the pilot power of the base station according to the calculated optimal pilot power and adjusts the antenna downtilt of the base station according to the adjustment value for the antenna downtilt; after the adjustment of the base station, the capacity and coverage of the base station also change correspondingly.

The embodiment of the present invention provides a method for optimizing capacity and coverage of a network, a base station acquires statistical information according to coverage information, uses the number of UEs in the base station that is obtained by counting as a first count, and sends the statistical information and the first count to a network coordination controller, so that the network coordination control, after receiving the statistical information and the first count, establishes a coverage cluster according to the statistical information, according to the statistical information and the first count, calculates a cluster value of the coverage cluster, uses the cluster value to calculate an entire-network coverage hole CH value and a coverage overlap CO value, and calculates an entire-network utility value, if it is determined, according to the entire-network utility value, that the capacity or coverage weight and the antenna downtilt of the base station need to be adjusted, acquires the adjustment value for the capacity or coverage weight of each base station and the adjustment value for the antenna downtilt of each base station according to an optimization strategy, and sends the adjustment values to a corresponding base station, so that the base station, according to the adjustment value for the capacity or coverage weight and the adjustment value for the antenna downtilt, calculates the optimal pilot power, so as to adjust the capacity and coverage of the base station. Therefore, the network coordination controller adjusts the adjustment value for the capacity or coverage weight of each base station and the adjustment value for the antenna downtilt of each base station according to the capacity and coverage conditions of all base stations, and each base station adjusts the pilot power, so as to maximize the capacity of a base station while guaranteeing the coverage of the base station, and effectively control the coverage hole and coverage overlap performance of the entire network, and as communications only occur between the base station and the network coordination controller and communications between base stations are not required, the signaling exchange load of a system is reduced at the same time.

Figure 6:
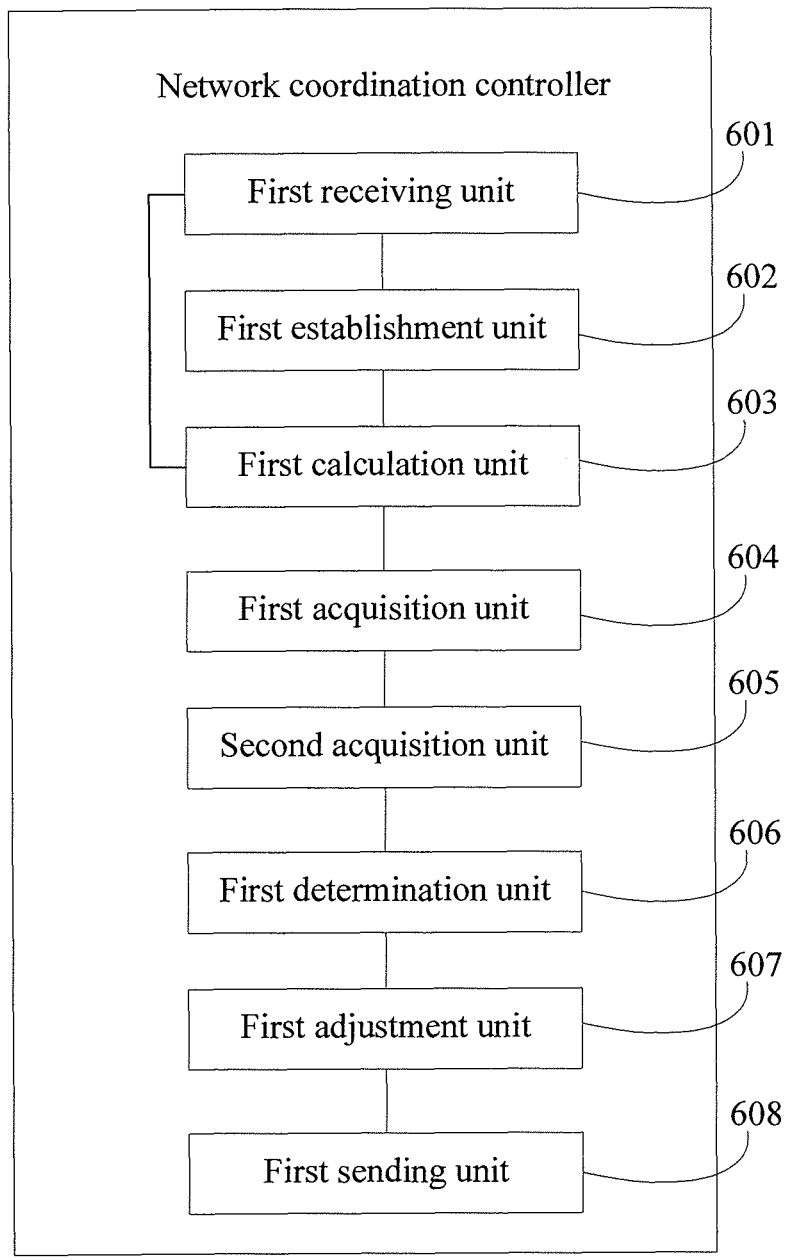
FIG. 6 is a schematic structural view of a network coordination controller provided in an embodiment of the present invention.

An embodiment of the present invention provides a network coordination controller, which, as shown in FIG. 6, includes the following:

A first receiving unit 601 is configured to receive statistical information and a first count that are sent by a base station.

The first count is the number of all user equipments UEs counted by the base station, and the statistical information includes information related to a coverage hole CH of the base station and/or information related to a coverage overlap CO of the base station.

Specifically, if the statistical information includes only CH information, the statistical information includes: the number of user equipments UEs in a CH area and a first identifier set formed of at least one base station identifier pair; the base station identifier pair includes a first base station identifier and a second base station identifier, the first base station identifier is used for identifying a base station with a CH detected by a UE that fails to establish a link, and the second base station identifier is used for identifying a base station where the UE that fails to establish a link is located after a link is successfully established.

If the statistical information includes only CO information, the statistical information includes: the number of UEs in a CO area and a second identifier set formed of at least one base station identifier pair; the base station identifier pair includes base station identifiers of at least two base stations with reference signal received power RSRP exceeding a first threshold value among the base stations identified by the UEs served by the base stations.

If the statistical information includes both CH information and CO information, the statistical information includes: the number of UEs in the CH area, the first identifier set, the number of UEs in the CO area, and the second identifier set.

A first establishment unit 602 is configured to establish at least one coverage cluster according to the received statistical information.

The coverage cluster is used for recording a base station identifier related to the CH or a base station identifier related to the CO.

Figure 7:
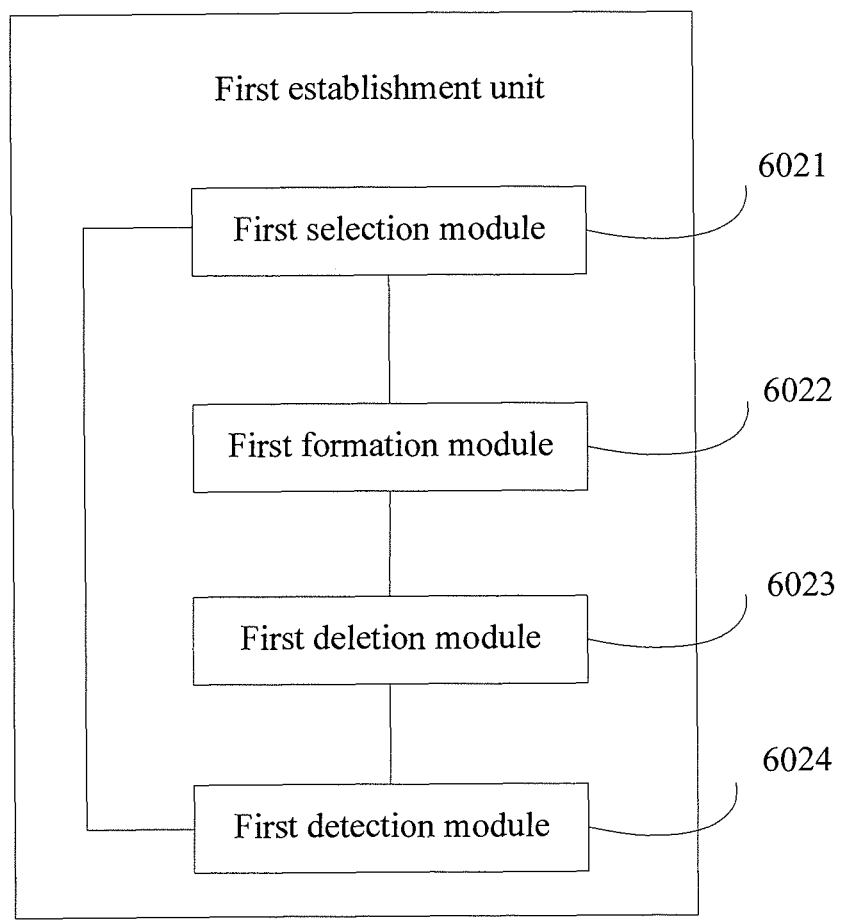
FIG. 7 is a schematic structural view of a first establishment unit of the network coordination controller shown in FIG. 6.

Specifically, the first establishment unit 602, as shown in FIG. 7, includes: a first selection module 6021, a first formation module 6022, a first deletion module 6023, and a first detection module 6024.

The first selection module 6021 is configured to select a base station identifier that appears the largest number of times in the first identifier set of the statistical information as a hole base station identifier.

The first formation module 6022 is configured to form a CH cluster according to the hole base station identifier selected by the first selection module 6021.

The first deletion module 6023 is configured to delete the base station identifier in the CH cluster from the first identifier set to update the first identifier set.

The first detection module 6024 is configured to detect whether the updated first identifier set is empty.

Figure 8:
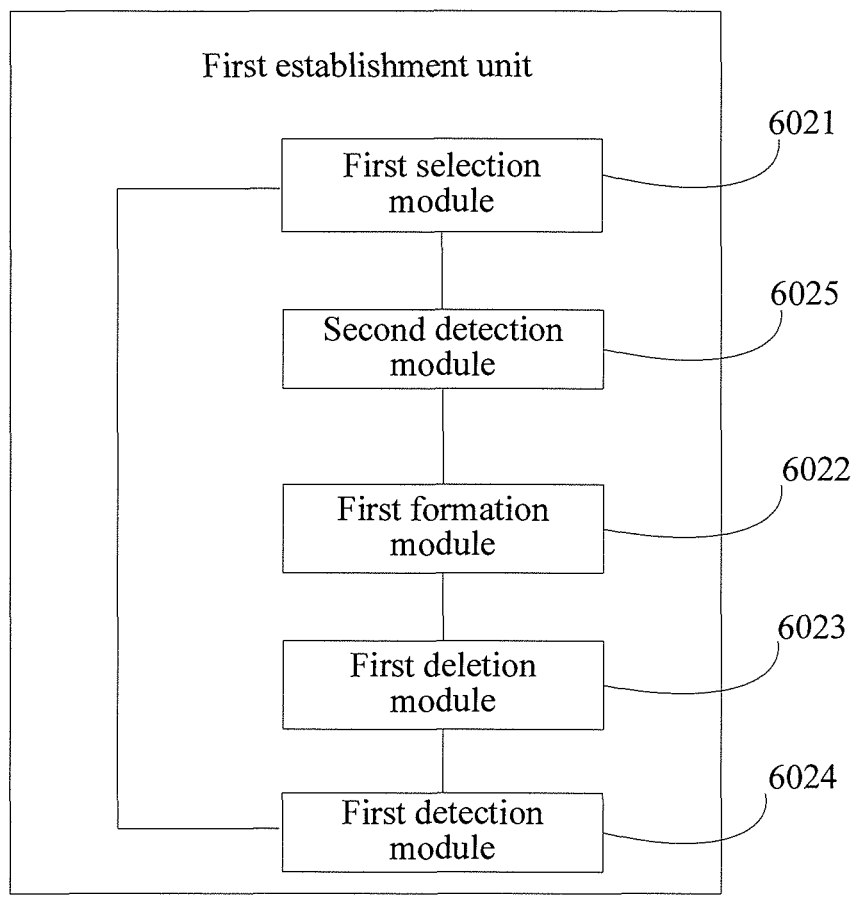
FIG. 8 is another schematic structural view of the first establishment unit of the network coordination controller shown in FIG. 6.

The first establishment unit 602, as shown in FIG. 8, further includes: a second detection module 6025.

The second detection module 6025 is configured to detect whether at least one second association base station identifier with the number of times of being associated with the hole base station identifier exceeding a second threshold value exists.

The first formation module 6022 is specifically configured to: if the second detection module 6025 detects that at least one first association base station identifier with the number of times of being associated with the hole base station identifier being larger than a second threshold value exists, form the hole base station identifier and the at least one first association base station identifier into one CH cluster; and if the second detection module 6025 detects that at least one first association base station identifier with the number of times of being associated with the hole base station identifier exceeding a second threshold value does not exist, form the hole base station identifier into one CH cluster.

Figure 9:
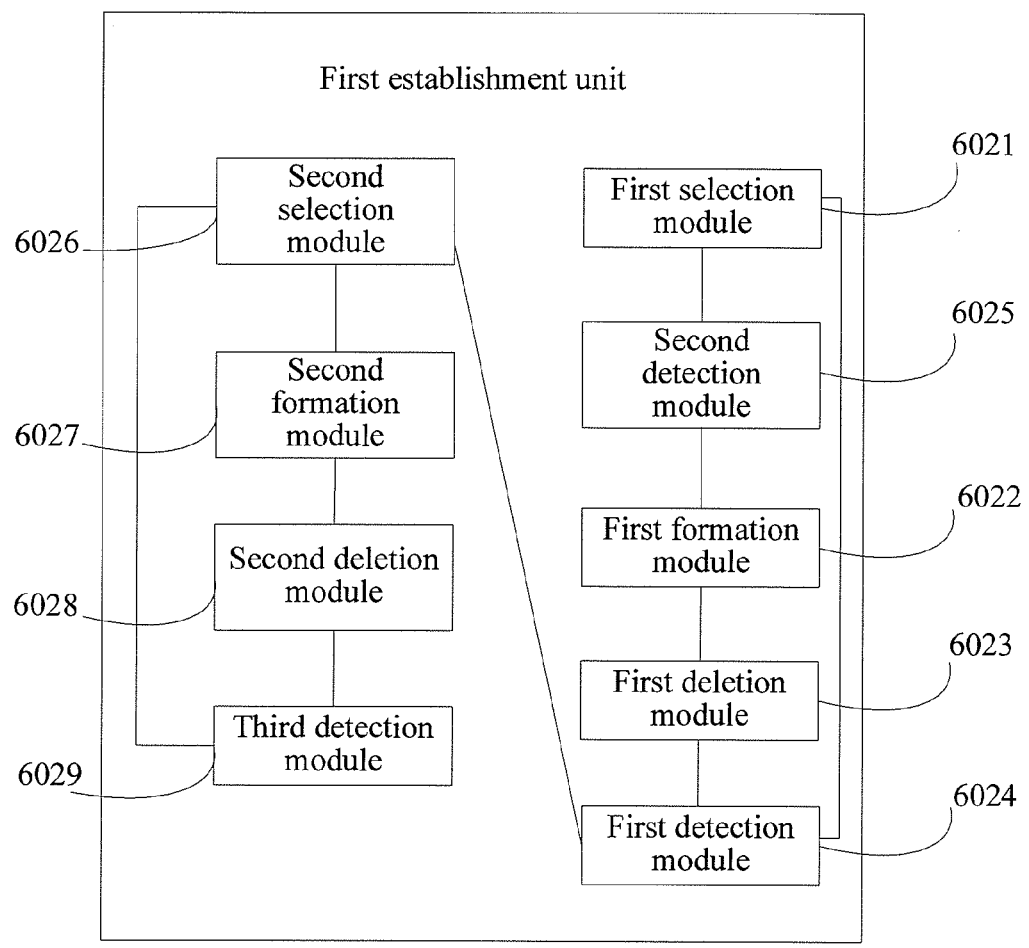
FIG. 9 is yet another schematic structural view of the first establishment unit of the network coordination controller shown in FIG. 6.

The first establishment unit 602, as shown in FIG. 9, further includes: a second selection module 6026, a second formation module 6027, a second deletion module 6028, and a third detection module 6029.

The second selection module 6026 is configured to select a base station identifier that appears the largest number of times in the second identifier set of the statistical information as an overlap base station identifier.

The second formation module 6027 is configured to form a CO cluster according to the overlap base station identifier selected by the second selection module 6026.

The second deletion module 6028 is configured to delete the base station identifier in the CO cluster from the second identifier set to update the second identifier set.

The third detection module 6029 is configured to detect whether the updated second identifier set is empty.

Figure 10:
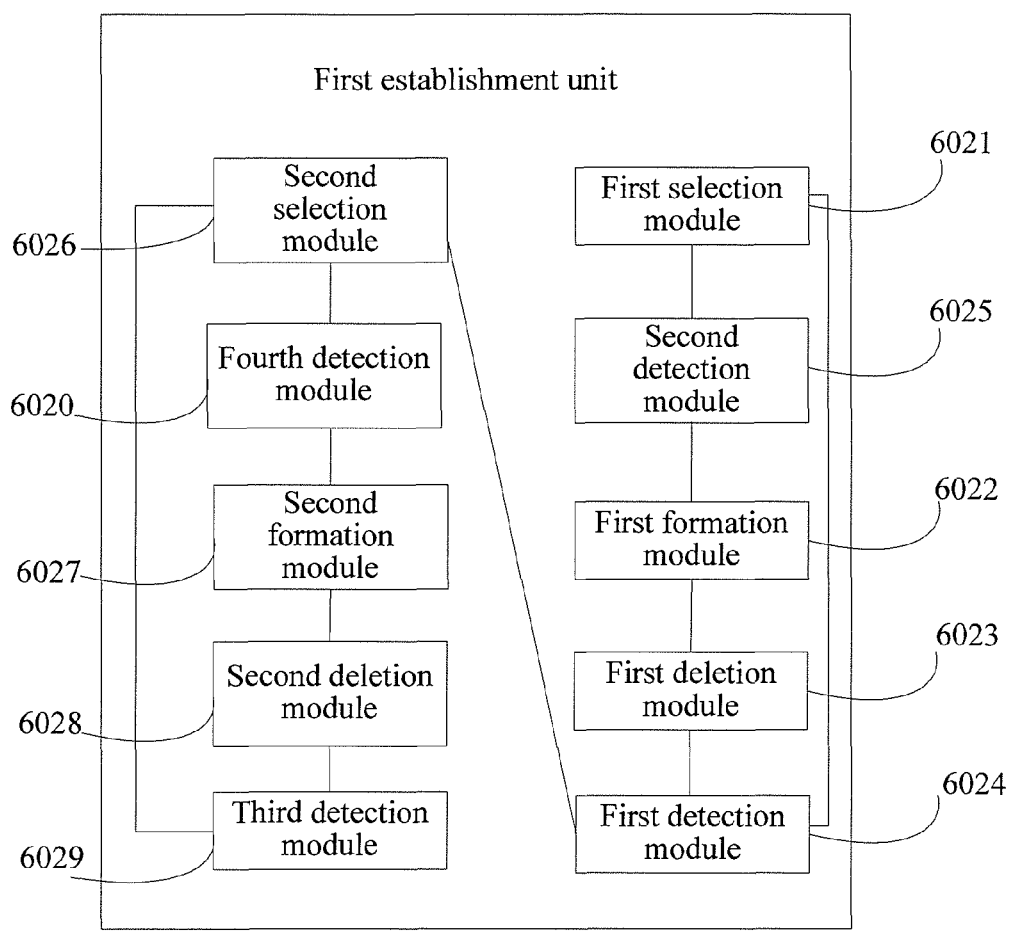
FIG. 10 is further a schematic structural view of the first establishment unit of the network coordination controller shown in FIG. 6.

The first establishment unit 602, as shown in FIG. 10, further includes: a fourth detection module 6020.

The fourth detection module 6020 is configured to detect whether at least one second association base station identifier with the number of times of being associated with the overlap base station identifier exceeding a third threshold value exists.

The second formation module 6027 is specifically configured to, if the fourth detection module 6020 detects that at least one second association base station identifier with the number of times of being associated with the overlap base station identifier exceeding a third threshold value exists, form the overlap base station identifier and the at least one second association base station identifier into one CO cluster; and if the fourth detection module 6020 detects that at least one second association base station identifier with the number of times of being associated with the overlap base station identifier exceeding a third threshold value does not exist, form the overlap base station identifier into one CO cluster.

It should be noted that, the first establishment unit may form a CH cluster before a CO cluster, or form a CO cluster before a CH cluster, or form a CH cluster and a CO cluster at the same time. The drawing only shows the case where a CH cluster is formed before a CO cluster.

The first calculation unit 603 is configured to calculate cluster values of all the coverage clusters according to the first count and the statistical information. The cluster value is a CH value or a CO value of each coverage cluster.

The first acquisition unit 604 is configured to acquire an entire-network CH value and an entire-network CO value according to the cluster values of all the coverage clusters.

The second acquisition unit 605 is configured to calculate an entire-network utility value according to the entire-network CH value and the entire-network CO value.

The first determination unit 606 is configured to determine, according to the entire-network utility value, whether an antenna downtilt and a capacity or coverage weight of each base station in all coverage clusters need to be adjusted.

Specifically, the first determination unit 606 detects whether the entire-network utility value is larger than a fourth threshold value; if the entire-network utility value is larger than the fourth threshold value, the antenna downtilt and the capacity or coverage weight of each base station in all coverage clusters do not need to be adjusted. If the entire-network utility value is not larger than the fourth threshold value, the antenna downtilt and capacity or coverage weight of each base station in all coverage clusters need to be adjusted. Alternatively, it is detected whether a difference value between the entire-network utility value and an entire-network utility value in the previous adjustment process is smaller than a fifth threshold value; if the difference value is smaller than the fifth threshold value, the antenna downtilt and the capacity or coverage weight of each base station in all coverage clusters do not need to be adjusted. If the difference value is not smaller than the fifth threshold value, the antenna downtilt and capacity or coverage weight of each base station in all coverage clusters need to be adjusted.

The first adjustment unit 607 is configured to, if the adjustment is needed, acquire an adjustment value for the antenna downtilt and an adjustment value for the capacity or coverage weight of each base station according to an optimization strategy.

The first sending unit 608 is configured to send the acquired adjustment value for the antenna downtilt of each base station and the acquired adjustment value for the capacity or coverage weight of each base station to a corresponding base station, so that the base station calculates the optimal pilot power.

Figure 11:
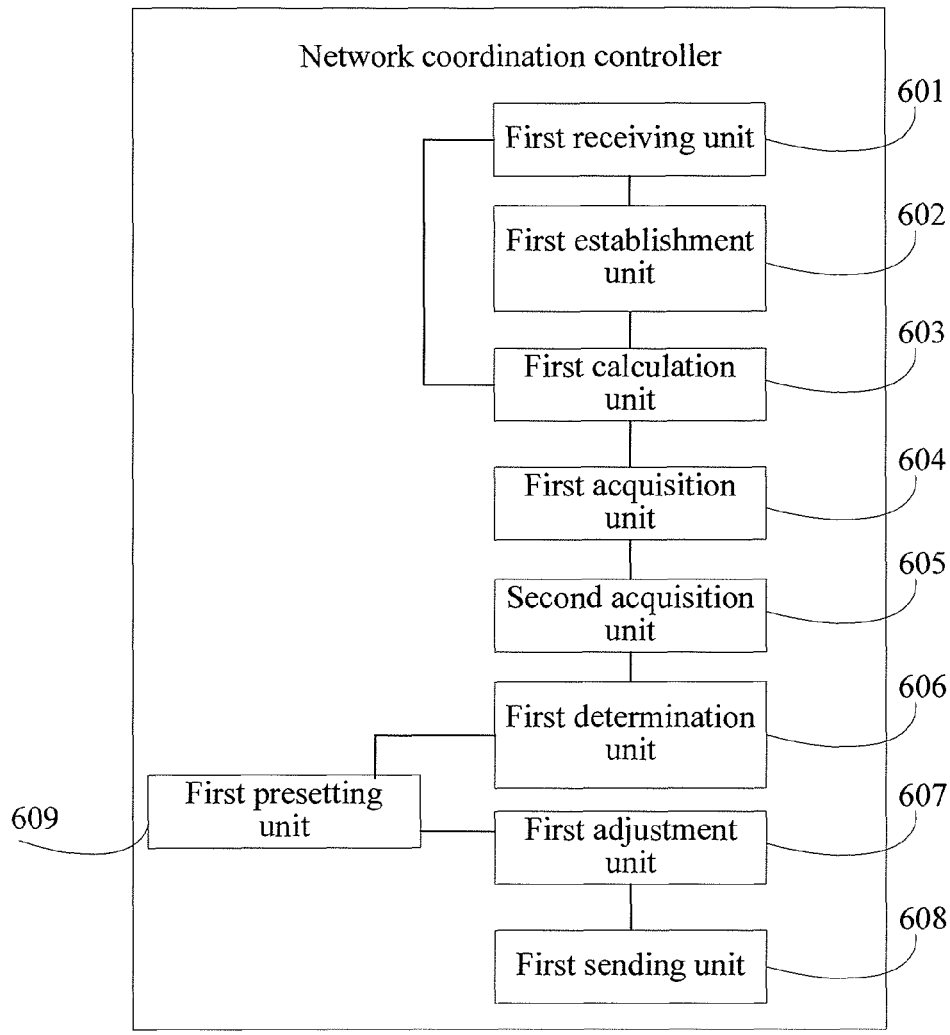
FIG. 11 is a schematic structural view of another network coordination controller provided in an embodiment of the present invention.

The network coordination controller, as shown in FIG. 11, further includes a first presetting unit 609.

Figure 12:
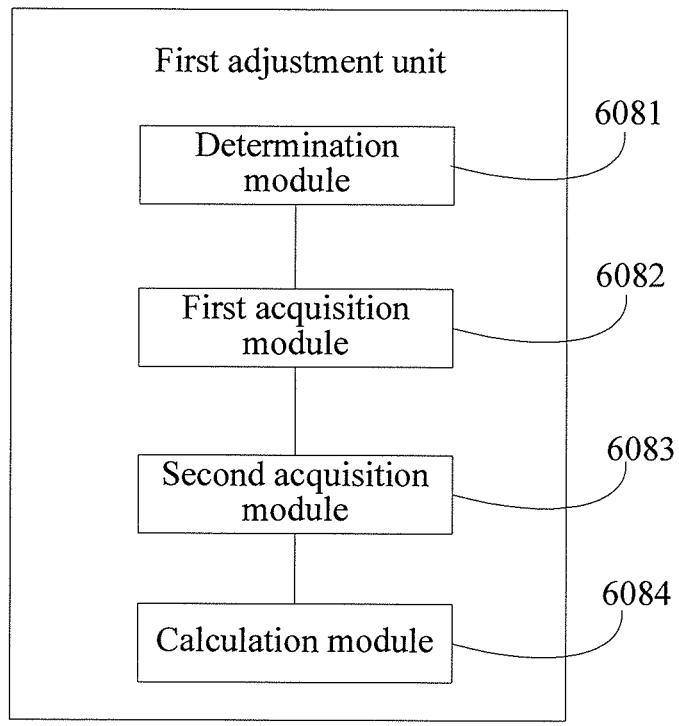
FIG. 12 is a schematic structural view of a first adjustment unit of the network coordination controller shown in FIG. 11.

The first adjustment unit 607, as shown in FIG. 12, includes: a determination module 6081, a first acquisition module 6082, a second acquisition module 6083, and a calculation module 6084.

The first presetting unit 609 is configured to divide a preset range according to the value range of the cluster value of the coverage cluster, and preset the maximum adjustment value for a capacity or coverage weight and the maximum adjustment value for an antenna downtilt corresponding to each preset range.

The determination module 6081 is configured to determine a preset range at which a cluster value of each coverage cluster is.

The first acquisition module 6082 is configured to learn the maximum adjustment value for a capacity or coverage weight and the maximum adjustment value for an antenna downtilt corresponding to the preset range from the preset range determined by the determination module 6081.

The preset range is a range divided from the value range of the cluster value of the coverage cluster in advance.

The second acquisition module 6083 is configured to acquire the number of neighboring base stations of each base station within the coverage cluster of the base station.

The calculation module 6084 is configured to, according to the number of neighboring base stations of each base station acquired by the second acquisition module 6083, and the maximum adjustment value for a capacity or coverage weight and the maximum adjustment value for an antenna downtilt acquired by the first acquisition module 6082, obtain the adjustment value for the capacity or coverage weight of each base station and the adjustment value for the antenna downtilt of each base station within the coverage cluster.

Specifically, according to the formulas $$\Delta tilt_j = \Delta tilt_{max}^{CO}[K1] \text{ and } \Delta w_{l,j} = \frac{N_j \Delta w_{l,max}}{6},$$

obtain the adjustment value for the capacity or coverage weight of each base station and the adjustment value for the antenna downtilt of each base station within the coverage cluster.

j denotes a sequence number of a base station; $\Delta tilt_j$ denotes an adjustment value for the antenna downtilt of the base station j, $\Delta w_{l,j}$ denotes an adjustment value for the capacity or coverage weight of the base station j, $\Delta w_{l,max}$ denotes the maximum adjustable value for the capacity or coverage weight of the coverage cluster, when l=1, $\Delta w_{l,j}$ denotes the adjustment value for the capacity weight for the base station j, $\Delta w_{l,max}$ denotes the maximum adjustable value for the capacity weight of the coverage cluster, when l=2, $\Delta w_{l,j}$ denotes an adjustment value for the coverage weight of the base station j, $\Delta w_{l,max}$ denotes the maximum adjustable value for the coverage weight of the coverage cluster, $N_j$ denotes the number of neighboring base stations of the base station j in the coverage cluster; $\Delta tilt_{max}$ denotes the maximum adjustable value for the antenna downtilt of the coverage cluster.

Figure 13:
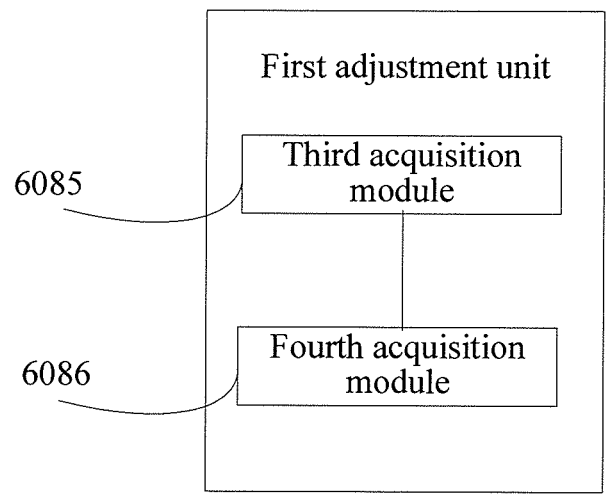
FIG. 13 is another schematic structural view of the first adjustment unit of the network coordination controller shown in FIG. 11.

The first adjustment unit 607, as shown in FIG. 13, includes: a third acquisition module 6085 and a fourth acquisition module 6086.

The third acquisition module 6085 is configured to, if a current adjustment is any adjustment other than the first adjustment, according to a preset modeling function, calculate a value of each independent variable minimizing the dependent variable of the modeling function within the preset condition.

The modeling function is a functional relationship of a dependent variable with an independent variable and an coefficient, each independent variable denotes the capacity or coverage weight and the antenna downtilt of each base station in an entire network, the dependent variable denotes the size of the entire-network CH or the size of the entire-network CO, the coefficient denotes a minimum error correlation value between a minimum value of the dependent variable after the previous adjustment and a value of the size of the entire-network CH and a value of the size of the entire-network CO acquired during the previous adjustment; the preset condition is a range of the independent variable during the calculation of the minimum value of the dependent variable.

The fourth acquisition module 6086 is configured to, if the current adjustment is the first adjustment, according to the preset modeling function, calculate the dependent variable and coefficient according to a preset value of each independent variable.

Figure 14:
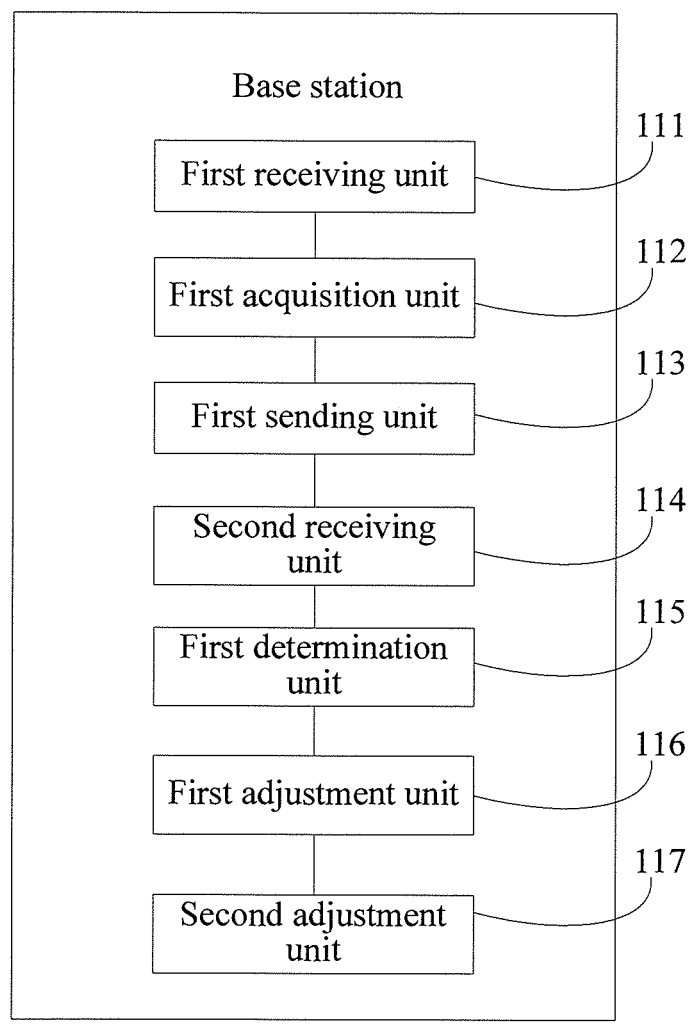
FIG. 14 is a schematic structural view of a base station provided in an embodiment of the present invention.

An embodiment of the present invention provides a base station, which, as shown in FIG. 14, includes the following:

The first receiving unit 111 is configured to receive coverage information sent by a user equipment UE.

The coverage information includes coverage hole CH information and/or coverage overlap CO information. The CH information includes a first base station identifier, the first base station identifier is used for identifying a base station with a CH detected by a UE that fails to establish a link; the CO information includes base station identifiers of at least two base stations with reference signal received power RSRP exceeding a first threshold value among all base stations identified by the UE.

The first acquisition unit 112 is configured to, according to the coverage information, acquire statistical information, and acquire a first count, where the first count is the number of all UEs served in the base station; and the statistical information includes information related to a coverage hole CH of the base station and/or information related to a coverage overlap CO of the base station.

Specifically, if the coverage information sent by the UE and received by the first receiving unit 111 includes only CH information, the statistical information includes only information related to a CH of the base station, and specifically includes: the number of UEs in a CH area and a first identifier set formed of at least one base station identifier pair.

The first acquisition unit 112 is specifically configured to: count UEs that send the CH information to obtain the number of the UEs that send the CH information; use the number of the UEs that send the CH information as the number of UEs in a CH area; acquire a base station identifier pair according to the CH information, form the at least one base station identifier pair into a first identifier set; where the base station identifier pair includes the first base station identifier and a second base station identifier, the second base station identifier is used for identifying a base station where the UE that fails to establish a link is located after a link is successfully established.

If the coverage information sent by the UE and received by the first receiving unit 111 includes only CO information, the statistical information includes only information related to a CO of the base station, and specifically includes: the number of UEs in a CO area and a second identifier set formed of at least one base station identifier pair.

The first acquisition unit 112 is specifically configured to: count UEs that send the CO information to obtain the number of the UEs that send the CO information; use the number of the UEs that send the CO information as the number of UEs in the CO area; according to the CO information, acquire base station identifiers of at least two base stations with reference signal received power RSRP exceeding a first threshold value among all base stations identified by the UE, form the acquired base station identifiers of at least two base stations into a base station identifier pair, and form the at least one base station identifier pair into a second identifier set.

If the coverage information sent by the UE and received by the first receiving unit 111 includes both CH information and CO information, the statistical information includes information related to a CH and information related to a CO of the base station, and specifically includes: the number of UEs in the CH area, the first identifier set, the number of UEs in the CO area, and the second identifier set.

The first acquisition unit 112 is specifically configured to: count UEs that send the CH information to obtain the number of the UEs that send the CH information; use the number of the UEs that send the CH information as the number of UEs in the CH area; according to the CH information, acquire a base station identifier pair, and form the at least one base station identifier pair into a first identifier set; the base station count UEs that send the CO information to obtain the number of the UEs that send the CO information; use the number of the UEs that send the CO information as the number of UEs in the CO area; and according to the CO information, acquire base station identifiers of at least two base stations with reference signal received power RSRP exceeding a first threshold value among all base stations identified by the UEs in the CO area, form the acquired base station identifiers of the at least two base stations into a base station identifier pair, and form the at least one base station identifier pair into a second identifier set.

The first sending unit 113 is configured to send the statistical information and first count acquired by the first acquisition unit 112 to the network coordination controller, so that the network controller establishes at least one coverage cluster according to the statistical information and the first count, learns an entire-network utility value, and determines, according to the entire-network utility value, whether a capacity or coverage weight and an antenna downtilt of each base station in all the coverage clusters need to be adjusted, if the adjustment is needed, acquires an adjustment value for the capacity or coverage weight of each base station and an adjustment value for the antenna downtilt of each base station according to an optimization strategy and sends the adjustment values to a corresponding base station.

The second receiving unit 114 is configured to receive the adjustment value for the capacity or coverage weight and the adjustment value for the antenna downtilt that are sent by the network coordination controller.

The first determination unit 115 is configured to determine whether the adjustment value for the capacity or coverage weight and the adjustment value for the antenna downtilt are zero.

The first adjustment unit 116 is configured to, if neither the adjustment value for the capacity or coverage weight nor the adjustment value for the antenna downtilt is zero, according to the value for the capacity or coverage weight and the adjustment value for the antenna downtilt, calculate the optimal pilot power.

Specifically, use the formula $p_j = \max w_{1,j}^L Cap_j + w_{2,j}^L Cov_j$ to calculate the optimal pilot power.

$p_j$ denotes the pilot power of the base station j, j denotes a sequence number of a base station, j is an integer, $w_{1,j}^L$ denotes a capacity weight, L is local (Local); $w_{2,j}^L$ denotes the coverage weight; $Cap_j$ denotes the average spectral efficiency of the base station, $$Cap_j = \frac{\sum_{k=1}^{K_j} \log(1 + SINR_{j,k})}{K_j},$$

$K_j$ denotes the total number of users of the base station; $Cov_j$ denotes the spectral efficiency of a % of users with the worst signal among all users served by the base station j, the value range of a is (0, 100], $Cov_j$=quantile($\log(1+SINR_{j,k})$,a %); $SINR_{j,k}$ is the reference signal of the kth user of the base station, k=1, 2, 3, . . . , and $K_j$, denoting the 1st user, 2nd user, 3rd user, . . . , and $K_j$th user of the base station;

$$SINR_{j,k} = \frac{p_j h_{j,k}}{\sigma^2 + \sum_{d \in I_j} p_d h_{d,k}},$$

d denotes the identifier of the neighboring base station that interferes with the base station; $I_j$ is a set of base station identifiers of all interference neighboring cell base stations; $p_d$ denotes the pilot power of an interference neighboring cell base station, $h_{d,k}$ denotes a channel gain of the interference neighboring cell base station d to the kth user of the base station j, $h_{j,k}$ denotes a channel gain of the kth user of the base station j, $h_{j,k}=PL_{j,k}(d) \cdot SF_{j,k} \cdot G_{j,k}(\phi,\theta)$, $PL_{j,k}(d)$ denotes the transmission path loss related to distance of the kth user of the base station j, $SF_{j,k}$ denotes the shadow fading of the kth user of the base station j, $G_{j,k}(\phi,\theta)$ denotes the antenna gain combining an azimuth and an angle elevation of the kth user of the base station j.

Figure 15:
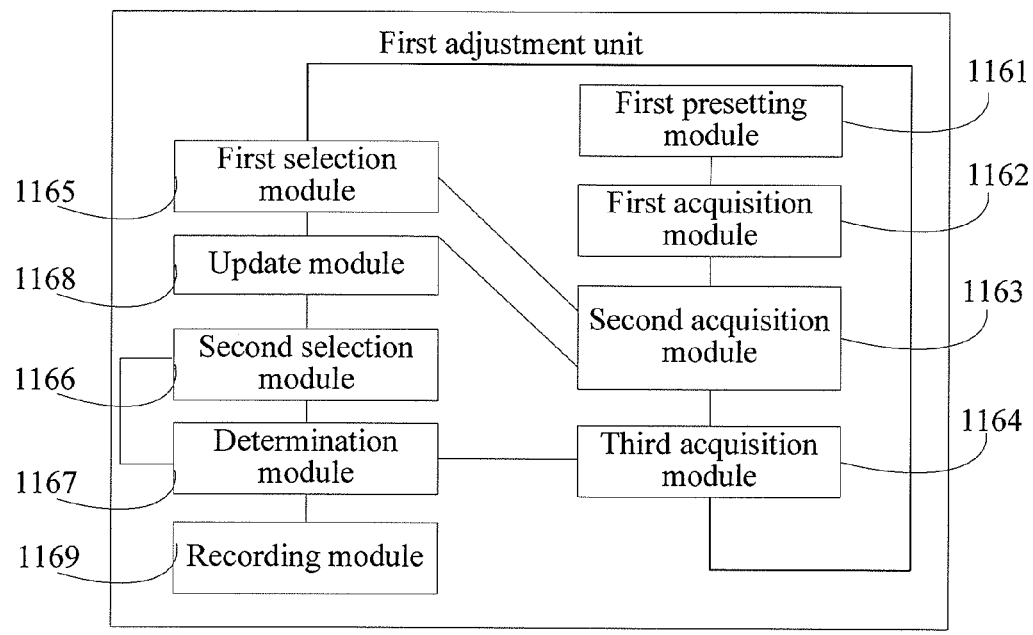
FIG. 15 is a schematic structural view of a first adjustment unit of the base station shown in FIG. 14.

Alternatively, the first adjustment unit 116, as shown in FIG. 15, includes: a first presetting module 1161, a first acquisition module 1162, a second acquisition module 1163, a third acquisition module 1164, a first selection module 1165, a second selection module 1166, a determination module 1167, an update module 1168, and a recording module 1169.

The first presetting module 1161 is configured to preset the first pilot power tree. The first pilot power tree is formed into a first pilot power tree set, and the number of the first pilot power trees in the first pilot power tree set is larger than or equal to the first preset value. The first preset value is the number of pieces of pilot power that needs to be calculated preset by the base station. The pilot power tree refers to that a leaf node of the tree bears a value or adjustment value of the pilot power of the base station.

The first acquisition module 1162 is configured to, according to the pilot power in the first pilot power tree in the first pilot power tree set, acquire the first local utility value corresponding to the first pilot power tree.

Figure 16:
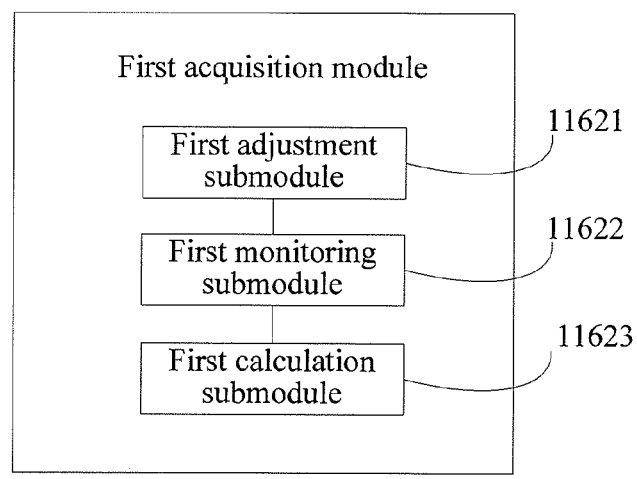
FIG. 16 is a schematic structural view of a first acquisition module shown in FIG. 15.

Specifically, the first acquisition module 1162, as shown in FIG. 16, includes: a first adjustment submodule 11621, a first monitoring submodule 11622, and a first calculation submodule 11623.

The first adjustment submodule 11621 is configured to, according to the pilot power of the first pilot power tree in the first pilot power tree set acquired by the first acquisition module 1162, adjust the pilot power of the base station.

The first monitoring submodule 11622 is configured to monitor the values of the capacity and coverage of the base station after each pilot power adjustment by the first adjustment submodule 11621.

The first calculation submodule 11623 is configured to, according to the values of the capacity and coverage monitored by the first monitoring submodule 11622, the adjustment value for the capacity weight and the adjustment value for the coverage weight, calculate the first local utility value corresponding to the first pilot power tree after each pilot power adjustment.

The second acquisition module 1163 is configured to acquire the second pilot power tree and form the at least one second pilot power tree into a second pilot power tree set.

Specifically, according to all first local utility values acquired by the first acquisition module 1162, select a first pilot power tree from the first pilot power trees as a second pilot power tree, and acquire the second local utility value corresponding to the second pilot power tree, and form the at least one second pilot power tree into a second pilot power tree set. The number of the selected first pilot power trees is equal to the first preset value.

The third acquisition module 1164 is configured to perform a genetic operation on the second pilot power tree in the second pilot power tree set to acquire a third pilot power tree, acquire a third local utility value corresponding to the third pilot power, and form the third pilot power tree into a third pilot power tree set.

Figure 17:
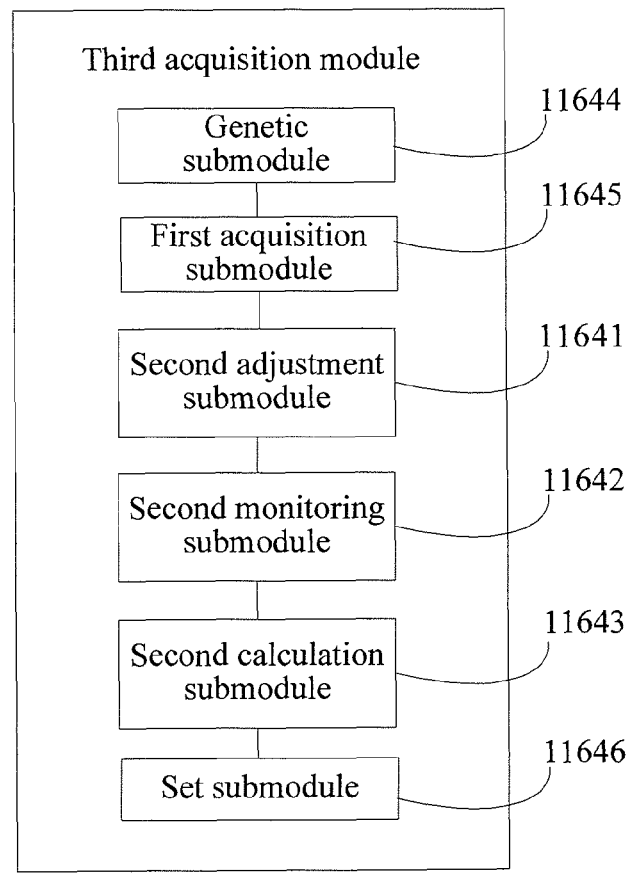
FIG. 17 is a schematic structural view of a third acquisition module shown in FIG. 15.

Specifically, the third acquisition module 1164, as shown in FIG. 17, includes: a genetic submodule 11644, a first acquisition submodule 11645, a second adjustment submodule 11641, a second monitoring submodule 11642, a second calculation submodule 11643, and a set submodule 11646.

The genetic submodule 11644 is configured to perform a genetic operation on the second pilot power tree in the second pilot power tree set.

The first acquisition submodule 11645 is configured to acquire a third pilot power tree according to the genetic submodule.

The second adjustment submodule 11641 is configured to, according to the pilot power of the third pilot power tree in the third pilot power tree set, adjust the pilot power of the base station.

The second monitoring submodule 11642 is configured to monitor the values of the capacity and coverage of the base station after the adjustment of the pilot power of the base station by the second adjustment submodule 11641 according to the pilot power of the third pilot power tree.

The second calculation submodule 11643 is configured to, according to the values of the capacity and coverage monitored by the second monitoring submodule 11642, the adjustment value for the capacity weight, and the adjustment value for the coverage weight, calculate the third local utility value corresponding to the third pilot power tree after each pilot power adjustment.

The set submodule 11646 is configured to form the third pilot power tree into a third pilot power tree set.

The first selection module 1165 is configured to, select pilot power trees whose number is the same as the first preset value, from the second pilot power tree set and the third pilot power tree set according to all the second local utility values and third local utility values, or from the third pilot power tree set according to the third local utility values. The number of the pilot power trees is equal to the first preset value.

The update module 1168 is configured to use the pilot power tree selected by the first selection module 1165 to update the second pilot power tree in the second pilot power tree set.

The second acquisition module 1163 is further configured to, according to the update module 1168, acquire the updated second pilot power tree, and acquire the second local utility value corresponding to the updated second pilot power tree in the second pilot power tree set.

The second selection module 1166 is configured to select the optimal local utility from the updated second local utility values acquired by the second acquisition module 1163.

The determination module 1167 is configured to determine whether the difference value between the two times of optimal local utility values is smaller than a sixth threshold value.

The difference value between the two times of optimal local utility values is the difference value between the optimal local utility value of the current time selected by the second selection module 1166 and the optimal local utility value acquired after the previous adjustment.

The recording module 1169 is configured to record the value of the cycle number.

The determination module 1167 is further configured to determine whether the value of the cycle number reaches a preset value.

Specifically, if the determination module 1167 determines that the difference value between the two times of optimal local utility values is not smaller than the sixth threshold value and the value of the cycle number does not reach the preset value, trigger the third acquisition unit 1164 to perform a genetic operation on the second pilot power tree in the second pilot power tree set to acquire the third pilot power tree. If the determination module 1167 determines that the difference value between the two times of optimal local utility values is smaller than the sixth threshold value, or the determination module 1167 determines that the value of the cycle number reaches the preset value, trigger the second selection module 1166 to find the optimal second pilot power tree and acquire the optimal pilot power.

The second selection module 1166 is further configured to, if the determination module 1167 determines that the difference value between the two times of optimal local utility values is smaller than the sixth threshold value, or the determination module 1167 determines that the value of the cycle number reaches the preset value, according to the optimal local utility value acquired the current time, find the optimal second pilot power tree corresponding to the optimal local utility value, and acquire the optimal pilot power from the optimal second pilot power tree.

The second adjustment unit 117 is configured to adjust pilot power of the base station to the calculated optimal pilot power, and adjust a value of the antenna downtilt to the adjustment value for the antenna downtilt, so as to adjust the capacity and coverage of the base station.

The embodiment of the present invention provides a device for optimizing a tradeoff between capacity and coverage of a network, a base station acquires statistical information according to coverage information, uses the number of UEs in the base station that is obtained by counting as a first count, and sends the statistical information and the first count to a network coordination controller. The network coordination control, after receiving the statistical information and the first count, establishes a coverage cluster according to the statistical information, according to the statistical information and the first count, calculates a cluster value of the coverage cluster, uses the cluster value to calculate an entire-network coverage hole CH value and an entire-network coverage overlap CO value, calculates an entire-network utility value, if it is determined, according to the entire-network utility value, that the capacity or coverage weight and the antenna downtilt of the base station need to be adjusted, acquires the adjustment value for the capacity or coverage weight of each base station and the adjustment value for the antenna downtilt of each base station according to an optimization strategy, and sends the adjustment values to a corresponding base station, so that the base station, according to the adjustment value for the capacity or coverage weight and the adjustment value for the antenna downtilt, calculates the optimal pilot power, so as to adjust the capacity and coverage of the base station. Therefore, the network coordination controller adjusts the adjustment value for the capacity or coverage weight of each base station and the adjustment value for the antenna downtilt of each base station according to the conditions of all base stations, and each base station adjusts the pilot power, so as to maximize the capacity of a base station while guaranteeing the coverage of the base station, and effectively control the coverage hole and coverage overlap performance of the entire network, and as communications only occur between the base station and the network coordination controller and communications between base stations are not required, the signaling exchange load of a system is reduced at the same time.

Figure 18:
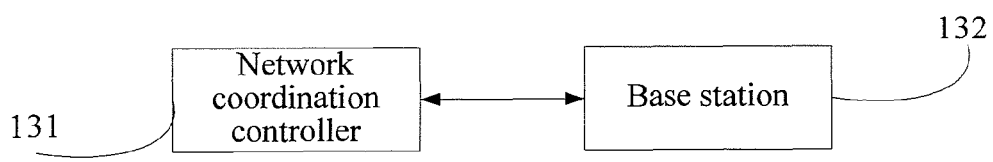
FIG. 18 is a system for optimizing a tradeoff between capacity and coverage of a network schematic view provided in an embodiment of the present invention.

An embodiment of the present invention provides a system for optimizing a tradeoff between capacity and coverage of a network, which, as shown in FIG. 18, includes: a network coordination controller 131 and a base station 132.

The network coordination controller 131 is configured to: receive statistical information and a first count that are sent by the base station 132, where the first count is the number of all user equipments UEs counted by the base station 132, and the statistical information includes information related to a coverage hole CH and information related to a coverage overlap CO of the base station; establish at least one coverage cluster according to the received statistical information; calculate cluster values of all the coverage clusters according to the first count and the statistical information, where the coverage cluster is used for recording a base station identifier related to the CH or a base station identifier related to the CO, and the cluster value is a CH value or a CO value of each coverage cluster; acquire an entire-network CH value and an entire-network CO value according to the cluster values of all the coverage clusters; calculate an entire-network utility value according to the entire-network CH value and the entire-network CO value; determine, according to the entire-network utility value, whether a capacity or coverage weight and an antenna downtilt of each base station in all the coverage clusters need to be adjusted; if the adjustment is needed, acquire the adjustment value for the capacity or coverage weight of each base station 132 and the adjustment value for the antenna downtilt of each base station 132 according to an optimization strategy; and send the acquired adjustment value for the capacity or coverage weight of each base station 132 and the acquired adjustment value for the antenna downtilt of each base station 132 to a corresponding base station 132, so that the base station 132 calculates the optimal pilot power.

The base station 132 is configured to receive the coverage information sent by a user equipment UE, where the coverage information includes coverage hole CH information and/or coverage overlap CO information, the CH information includes a first base station identifier, the first base station identifier is used for identifying a base station with a CH detected by a UE that fails to establish a link, and the CO information includes base station identifiers of at least two base stations with reference signal received power RSRP exceeding a first threshold value among all base stations identified by the UE; according to the coverage information, acquire statistical information, and acquire a first count; send the statistical information and the first count to a network controller 131, so that the network controller 131, according to the statistical information and the first count, establishes at least one coverage cluster, learns an entire-network utility value, and determines, according to the entire-network utility value, whether a capacity or coverage weight and an antenna downtilt of each base station in all the coverage clusters need to be adjusted, if the adjustment is needed, acquires an adjustment value for the capacity or coverage weight of each base station and an adjustment value for the antenna downtilt of each base station according to an optimization strategy and sends the adjustment values to a corresponding base station 132; receive the adjustment value for the capacity or coverage weight and the adjustment value for the antenna downtilt that are sent by the network coordination controller 131; if neither the adjustment value for the capacity or coverage weight nor the adjustment value for the antenna downtilt is zero, according to the adjustment value for the capacity or coverage weight and the adjustment value for the antenna downtilt, calculate the optimal pilot power; adjust the pilot power of the base station 132 to the calculated optimal pilot power, and adjust a value of the antenna downtilt to the adjustment value for the antenna downtilt, so as to adjust the capacity and coverage of the base station 132.

The embodiment of the present invention provides a system for optimizing a tradeoff between capacity and coverage of a network, a base station acquires statistical information according to coverage information, uses the number of UEs in the base station that is obtained by counting as a first count, and sends the statistical information and the first count to a network coordination controller. The network coordination control, after receiving the statistical information and the first count, establishes a coverage cluster according to the statistical information, according to the statistical information and the first count, calculates a cluster value of the coverage cluster, uses the cluster value to calculate an entire-network coverage hole CH value and an entire-network coverage overlap CO value, calculates an entire-network utility value, if it is determined, according to the entire-network utility value, that the capacity or coverage weight and the antenna downtilt of the base station need to be adjusted, acquires the adjustment value for the capacity or coverage weight of each base station and the adjustment value for the antenna downtilt of each base station according to an optimization strategy, and sends the adjustment values to a corresponding base station, so that the base station, according to the adjustment value for the capacity or coverage weight and the adjustment value for the antenna downtilt, calculate the optimal pilot power, so as to adjust the capacity and coverage of the base station. Therefore, the network coordination controller adjusts the adjustment value for the capacity or coverage weight of each base station and the adjustment value for the antenna downtilt of each base station according to the conditions of all base stations, and each base station adjusts the pilot power, so as to maximize the capacity of a base station while guaranteeing the coverage of the base station, and effectively control the coverage hole and coverage overlap performance of the entire network, and as communications only occur between the base station and the network coordination controller and communications between base stations are not required, the signaling exchange load of a system is reduced at the same time.

A person of ordinary skill in the art may understand that all or part of the steps of the methods in the embodiments may be implemented by a program instructing relevant hardware. The program may be stored in a computer readable storage medium. When the program is run, the foregoing steps of the methods in the embodiments are performed. The storage medium may be any medium capable of storing program codes, such as ROM, RAM, magnetic disk, or optical disk.

The foregoing descriptions are merely specific embodiments of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method for optimizing a tradeoff between capacity and coverage of a network, the method comprising:
receiving statistical information and a first count that are sent by a base station, wherein the first count is the number of all user equipments (UEs) counted by the base station, the statistical information comprises information related to a coverage hole (CH) of the base station and/or information related to a coverage overlap (CO) of the base station;
establishing at least one coverage cluster according to the received statistical information, and calculating cluster values of all the coverage clusters according to the first count and the statistical information, wherein the coverage cluster is used for recording a base station identifier related to the CH or a base station identifier related to the CO, and the cluster value is a CH value or a CO value of each coverage cluster;
acquiring an entire-network CH value and an entire-network CO value according to the cluster values of all the coverage clusters;
calculating an entire-network utility value according to the entire-network CH value and the entire-network CO value;
determining, according to the entire-network utility value, whether a capacity or coverage weight and an antenna downtilt of each base station in all the coverage clusters need to be adjusted;
if the adjustment is needed, acquiring an adjustment value for the capacity or coverage weight of each base station and an adjustment value for the antenna downtilt of each base station according to an optimization strategy;
sending the acquired adjustment value for the capacity or coverage weight of each base station and the acquired adjustment value for the antenna downtilt of each base station to a corresponding base station, so that the base station calculates the optimal pilot power.

2. The method according to claim 1, wherein:
if the statistical information comprises only the information related to the CH of the base station, the statistical information comprises: the number of UEs in a CH area and a first identifier set formed of at least one base station identifier pair, the base station identifier pair comprises a first base station identifier and a second base station identifier, the first base station identifier is used for identifying a base station with a CH detected by a UE that fails to establish a link, and the second base station identifier is used for identifying a base station where the UE that fails to establish a link is located after a link is successfully established;
if the statistical information comprises only the information related to the CO of the base station, the statistical information comprises: the number of UEs in a CO area and a second identifier set formed of at least one base station identifier pair; the base station identifier pair comprises base station identifiers of at least two base stations with reference signal received power (RSRP) exceeding a first threshold value among all base stations identified by the UEs served by the base stations;

if the statistical information comprises both the information related to the CH and the information related to the CO of the base station, the statistical information comprises: the number of UEs in the CH area, the first identifier set, the number of UEs in the CO area, and the second identifier set.

3. The method according to claim 2, wherein if the statistical information comprises CH information, establishing at least one coverage cluster according to the received statistical information specifically comprises:

cyclically selecting a base station identifier that appears the largest number of times in the first identifier set of the statistical information as a hole base station identifier, forming a CH cluster according to the hole base station identifier, and deleting the base station identifier in the CH cluster from the first identifier set to update the first identifier set until the updated first identifier set is empty.

4. The method according to claim 3, wherein forming a CH cluster according to the hole base station identifier comprises:

if at least one first association base station identifier with the number of times of being associated with the hole base station identifier being larger than a second threshold value exists, forming the hole base station identifier and the at least one first association base station identifier into one CH cluster; and if at least one first association base station identifier with the number of times of being associated with the hole base station identifier exceeding a second threshold value does not exist, forming the hole base station identifier into one CH cluster.

5. The method according to claim 2, wherein if the statistical information comprises the information related to the CO, establishing at least one coverage cluster according to the received statistical information comprises:

cyclically selecting a base station identifier that appears the largest number of times in the second identifier set of the statistical information as an overlap base station identifier, forming a CO cluster according to the overlap base station identifier, and deleting the base station identifier in the CO cluster from the second identifier set to update the second identifier set until the updated second identifier set is empty.

6. The method according to claim 5, wherein forming a CO cluster according to the overlap base station identifier comprises:

if at least one second association base station identifier with the number of times of being associated with the overlap base station identifier exceeding a third threshold value exists, forming the overlap base station identifier and the at least one second association base station identifier into one CO cluster; if at least one second association base station identifier with the number of times of being associated with the overlap base station identifier exceeding a third threshold value does not exist, forming the overlap base station identifier into one CO cluster.

7. The method according to claim 1, wherein determining, according to the entire-network utility value, whether a capacity or coverage weight and an antenna downtilt of each base station in all the coverage clusters need to be adjusted comprises:

detecting whether the entire-network utility value is larger than a fourth threshold value; wherein if the entire-network utility value is larger than the fourth threshold value, the capacity or coverage weight and the antenna downtilt of each base station in all the coverage clusters do not need to be adjusted;

if the entire-network utility value is not larger than the fourth threshold value, the capacity or coverage weight and the antenna downtilt of each base station in all the coverage clusters need to be adjusted; or, detecting whether a difference value between the entire-network utility value and an entire-network utility value in the previous adjustment process is smaller than a fifth threshold value; wherein if the difference value is smaller than the fifth threshold value, the capacity or coverage weight and the antenna downtilt of each base station in all the coverage clusters do not need to be adjusted;

if the difference value is not smaller than the fifth threshold value, the capacity or coverage weight and the antenna downtilt of each base station in all the coverage clusters need to be adjusted.

8. The method according to claim 1, wherein acquiring an adjustment value for the capacity or coverage weight of each base station and an adjustment value for the antenna downtilt of each base station according to an optimization strategy comprises:

determining a preset range at which a cluster value of each coverage cluster is, and learning a maximum adjustable value for the capacity or coverage weight corresponding to the preset range and a maximum adjustable value for the antenna downtilt corresponding to the preset range; wherein the preset range is a range divided from the value range of the cluster value of the coverage cluster in advance; and acquiring the number of neighboring base stations of each base station within the coverage cluster of the base station, and obtaining the adjustment value for the capacity or coverage weight of each base station and the adjustment value for the antenna downtilt of each base station within the coverage cluster according to the acquired number of neighboring base stations of each base station, the maximum adjustment value for the capacity or coverage weight, and the maximum adjustment value for the antenna downtilt.

9. The method according to claim 8, wherein obtaining the adjustment value for the capacity or coverage weight of each base station and the adjustment value for the antenna downtilt of each base station within the coverage cluster according to the acquired number of neighboring base stations of each base station, the maximum adjustment value for the capacity or coverage weight, and the maximum adjustment value for the antenna downtilt comprises:

according to formulas $$\Delta tilt_j = \frac{N_j(tilt)_{max}}{6} \text{ and } \Delta w_{l,j} = \frac{N_j \Delta w_{l,max}}{6},$$

obtaining the adjustment value for the capacity or coverage weight of each base station and the adjustment value for the antenna downtilt of each base station within the coverage cluster;

wherein j denotes a sequence number of a base station; $\Delta tilt_j$ denotes an adjustment value for the antenna downtilt of the base station j, $\Delta w_{l,j}$ denotes an adjustment value for the capacity or coverage weight of the base station j, $\Delta w_{l,max}$ denotes the maximum adjustable value for the capacity or coverage weight of the coverage cluster, when $l=1$, $\Delta w_{l,j}$ denotes an adjustment value for the capacity weight of the base station j, $\Delta w_{l,max}$ denotes the maximum adjustable value for the capacity weight of the coverage cluster, when $l=2$, $\Delta w_{l,j}$ denotes an adjustment value for the coverage weight of the base station j, $\Delta w_{l,max}$ denotes the maximum adjustable value for the coverage weight of the coverage cluster, $N_j$ denotes the number of neighboring base stations of the base station j within the coverage cluster; and $\Delta tilt_{max}$ denotes the maximum adjustable value for the antenna downtilt of the coverage cluster.

10. The method according to claim 1, wherein acquiring an adjustment value for the capacity or coverage weight of each base station and an adjustment value for the antenna downtilt of each base station according to an optimization strategy comprises:
   if a current adjustment is any adjustment other than a first adjustment, calculating an adjustment value for a capacity or coverage weight and an adjustment value for an antenna downtilt of each base station in the any adjustment comprises:
      according to a preset modeling function, calculating a value of each independent variable minimizing a dependent variable of the modeling function within a preset condition; wherein the modeling function is a functional relationship of the dependent variable with the independent variable and a coefficient, each independent variable denotes the capacity or coverage weight and the antenna downtilt of each base station in an entire network, the dependent variable denotes an entire-network CH or an entire-network CO, the coefficient denotes a minimum error correlation value between a minimum value of the dependent variable after the previous adjustment and an entire-network CH value or entire-network CO value acquired during the previous adjustment; and the preset condition is a range of the independent variable during the calculation of the minimum value of the dependent variable; and
   if the current adjustment is a first adjustment, according to the preset modeling function, calculating the dependent variable and coefficient according to a preset value of each independent variable.

11. A method for optimizing a tradeoff between capacity and coverage of a network, the method comprising:
   receiving, by a base station, coverage information sent by a user equipment UE; wherein the coverage information comprises coverage hole CH information and/or coverage overlap CO information, the CH information comprises a first base station identifier, the first base station identifier is used for identifying a base station with a CH detected by a UE that fails to establish a link, and the CO information comprises base station identifiers of at least two base stations with reference signal received power RSRP exceeding a first threshold value among all base stations identified by the UE;
   according to the coverage information, acquiring statistical information, and acquiring a first count; sending the statistical information and the first count to a network controller, so that the network controller establishes at least one coverage cluster according to the statistical information and the first count, learns an entire-network utility value, and determines, according to the entire-network utility value, whether a capacity or coverage weight and an antenna downtilt of each base station in all the coverage clusters need to be adjusted, if the adjustment is needed, the network controller acquires an adjustment value for the capacity or coverage weight of each base station and an adjustment value for the antenna downtilt of each base station according to an optimization strategy and sends the adjustment values to a corresponding base station, wherein the first count is the number of all UEs served in the base station, and the statistical information comprises information related to a coverage hole CH of the base station and/or information related to a coverage overlap CO of the base station;
   receiving the adjustment value for the capacity or coverage weight of each base station and the adjustment value for the antenna downtilt that are sent by the network coordination controller;
   if neither the adjustment value for the capacity or coverage weight nor the adjustment value for the antenna downtilt is zero, calculating the optimal pilot power according to the adjustment value for the capacity or coverage weight of each base station and the adjustment value for the antenna downtilt; and
   adjusting pilot power of the base station to the calculated optimal pilot power, and adjusting a value of the antenna downtilt to the adjustment value for the antenna downtilt, so as to adjust the capacity and coverage of the base station.

12. The method according to claim 11, wherein:
   if the coverage information sent by the UE and received by the base station comprises only CH information, the statistical information comprises only the information related to the CH of the base station which comprises: the number of UEs in a CH area and a first identifier set formed of at least one base station identifier pair, and acquiring statistical information according to the coverage information comprises:
      counting, by the base station, UEs that send the CH information to obtain the number of the UEs that send the CH information; using the number of UEs that send the CH information as the number of UEs in the CH area; and according to the CH information, acquiring the base station identifier pair, forming the at least one base station identifier pair into the first identifier set; wherein the base station identifier pair comprises the first base station identifier and a second base station identifier, and the second base station identifier is used for identifying a base station where the UE that fails to establish a link is located after a link is successfully established;
   if the coverage information sent by the UE and received by the base station comprises only CO information, the statistical information comprises only the information related to the CO of the base station which comprises: the number of UEs in a CO area and a second identifier set formed of at least one base station identifier pair, and acquiring statistical information according to the coverage information comprises:
      counting, by the base station, UEs that send the CO information to obtain the number of the UEs that send the CO information; using the number of the UEs that send the CO information as the number of UEs in the CO area; and according to the CO information, acquiring the base station identifiers of at least two base stations with reference signal received power RSRP exceeding the first threshold value among all base stations identified by the UE, forming the acquired base station identifiers of at least two base stations into the base station identifier pair, and forming the at least one base station identifier pair into the second identifier set; and if the coverage information sent by the UE and received by the base station comprises both the CH information and the CO information, the statistical information comprises the information related to the CH and the information related to the CO of the base station which comprises: the number of UEs in the CH area, the first identifier set, the number of UEs in the CO area, and the second identifier set, and acquiring statistical information according to the coverage information is specifically:

counting, by the base station, UEs that send the CH information to obtain the number of the UEs that send the CH information; using the number of the UEs that send the CH information as the number of UEs in the CH area; and according to the CH information, acquiring the base station identifier pair, forming the at least one base station identifier pair into the first identifier set; counting, by the base station, UEs that send the CO information to obtain the number of the UEs that send the CO information; using the number of the UEs that send the CO information as the number of UEs in the CO area; and according to the CO information, acquiring the base station identifiers of at least two base stations with reference signal received power (RSRP) exceeding the first threshold value among the all base stations identified by the UE in the CO area, forming the acquired base station identifiers of at least two base stations into the base station identifier pair, and forming the at least one base station identifier pair into the second identifier set.

13. The method according to claim 11, wherein calculating the optimal pilot power according to the adjustment value for the capacity or coverage weight of each base station and the adjustment value for the antenna downtilt comprises:

using a formula $p_{j=max\ w1, j}$ $w_{1,j}^L \text{Cap}_j + w_{2,j}^L \text{Cov}_j$, calculating the optimal pilot power;

wherein $p_j$ denotes the pilot power of the base station j, j denotes a sequence number of a base station, and j is an integer, $w_{1,j}^L$ denotes a capacity weight, $w_{2,j}^L$ denotes a coverage weight; L denotes local (local) and denotes a capacity weight and coverage weight within the base station j; $\text{Cap}_j$ denotes an average spectral efficiency of the base station, $$Cap_j = \frac{\sum_{k=1}^{K_j} \log(1 + SINR_{j,k})}{K_j},$$

$K_j$ denotes a total number of users of the base station; $\text{Cov}_j$ denotes a spectral efficiency of a % users with the worst signal among all users served by the base station, a value range of a is (0, 100], $\text{Cov}_j$=quantile(log(1+SINR$_{j,k}$), a %); SINR$_{j,k}$ is a reference signal of the kth user of the base station, k=1, 2, 3, . . ., and $K_j$, denoting the 1st user, 2nd user, 3rd user, . . ., and $K_j$ th user of the base station;

$$SINR_{j,k} = \frac{p_j h_{j,k}}{\sigma^2 + \sum_{d \in I_j} p_d h_{d,k}},$$

d denotes an identifier of a neighboring base station that interferes with the base station; Ij is a set of base station identifiers of all interference neighboring cell base stations; $P_d$ denotes pilot power of the interference neighboring cell base station, $h_{d,k}$ denotes a channel gain of the interference neighboring cell base station d to the kth user of the base station j, $h_{j,k}$ denotes a channel gain of the kth user of the base station j, $h_{j,k}=PL_{j,k}(d) \cdot SF_{j,k} \cdot G_{j,k}(\phi, \theta)$, $PL_{j,d}(d)$ denotes a transmission path loss related to a distance of the kth user of the base station j, $SF_{j,k}$ denotes shadow fading of the kth user of the base station j, and $G_{j,k}(\phi, \theta)$ denotes an antenna gain combining an azimuth and an angle elevation of the kth user of the base station j.

14. The method according to claim 11, wherein calculating the optimal pilot power according to the adjustment value for the capacity or coverage weight of each base station and the adjustment value for the antenna downtilt comprises:

according to pilot power of a first pilot power tree in a first pilot power tree set, acquiring a first local utility value corresponding to the first pilot power tree, according to all the acquired first local utility values, selecting a first pilot power tree from the first pilot power trees as a second pilot power tree, and acquiring a second local utility value corresponding to the second pilot power tree, and forming the at least one second pilot power tree into a second pilot power tree set, wherein the first pilot power tree is preset; forming the first pilot power tree into the first pilot power tree set, wherein the number of the first pilot power trees in the first pilot power tree set is larger than or equal to a first preset value, the first preset value is the number of pieces of pilot power that needs to be calculated preset by the base station, the pilot power tree refers to that a leaf node of the tree bears a value or adjustment value of the pilot power of the base station; and the number of the selected first pilot power trees is equal to the first preset value;

performing a genetic operation on the second pilot power tree in the second pilot power tree set cyclically to acquire a third pilot power tree, acquiring a third local utility value corresponding to the third pilot power, and forming the third pilot power tree into a third pilot power tree set;

selecting a pilot power tree, from the second pilot power tree set and the third pilot power tree set according to all the second local utility values and the third local utility values, or from the third pilot power tree set according to the third local utility values, using the selected pilot power tree to update the second pilot power tree in the second pilot power tree set, and acquiring the second local utility value corresponding to the updated second pilot power tree in the second pilot power tree set, wherein the number of the pilot power trees is equal to the first preset value; and acquiring the optimal local utility value from the updated second local utility values, which ends until a difference value between the two times of optimal local utility values is smaller than a sixth threshold value or the value of a cycle number reaches a preset value, and according to the optimal local utility value acquired the current time, finding an optimal second pilot power tree corresponding to the optimal local utility value, and acquiring the optimal pilot power from the optimal second pilot power tree; the difference value between the two times of optimal local utility values refers to the difference value between the optimal local utility value acquired the current time and the optimal local utility value acquired after the previous adjustment.

15. The method according to claim 14, wherein according to the pilot power of a first pilot power tree in a first pilot power tree set, acquiring a first local utility value corresponding to the first pilot power tree comprises:
adjusting, by the base station, according to the pilot power of the first pilot power tree in the first pilot power tree set, the pilot power of the base station, monitoring the values of the capacity and coverage of the base station after each pilot power adjustment, and according to the monitored values of the capacity and coverage, the adjustment value for the capacity weight, and the adjustment value for the coverage weight, calculating the first local utility value corresponding to the first pilot power tree after each pilot power adjustment.

16. The method according to claim 14, wherein acquiring the third local utility value corresponding to the third pilot power comprises:
adjusting, by the base station, according to the pilot power of the third pilot power tree in the third pilot power tree set, the pilot power of the base station, monitoring values of the capacity and coverage after each pilot power adjustment, and according to the monitored values of the capacity and coverage, the adjustment value for the capacity weight, and the adjustment value for the coverage weight, calculating the third local utility value corresponding to the third pilot power after each pilot power adjustment.

17. A network coordination controller, comprising:
a processor; and
memory coupled to the processor, the memory comprising instructions that, when executed by the processor, cause the network coordination controller to:
receive statistical information and a first count that are sent by a base station, wherein the first count is the number of all user equipments (UEs) counted by the base station, the statistical information comprises information related to a coverage hole (CH) of the base station and/or information related to a coverage overlap (CO) of the base station;
establish at least one coverage cluster according to the received statistical information, wherein the coverage cluster is used for recording a base station identifier related to the CH or a base station identifier related to the CO;
calculate cluster values of all the coverage clusters according to the first count and the statistical information; wherein the cluster value is a CH value or a CO value of each coverage cluster;
acquire an entire-network CH value and an entire-network CO value according to the cluster values of all the coverage clusters;
calculate an entire-network utility value according to the entire-network CH value and the entire-network CO value;
determine, according to the entire-network utility value, whether an antenna downtilt and a capacity or coverage weight of each base station in all the coverage clusters need to be adjusted;
if the adjustment is needed, acquire an adjustment value for the antenna downtilt and an adjustment value for the capacity or coverage weight of each base station according to an optimization strategy; and
send the acquired adjustment value for the antenna downtilt of each base station and the acquired adjustment value for the capacity or coverage weight of each base station to a corresponding base station, so that the base station calculates the optimal pilot power.

18. The network coordination controller according to claim 17, wherein:
if the statistical information comprises only the information related to the CH of the base station, the statistical information comprises: the number of user equipments UEs in a CH area and a first identifier set formed of at least one base station identifier pair; the base station identifier pair comprises a first base station identifier and a second base station identifier, the first base station identifier is used for identifying a base station with a CH detected by a UE that fails to establish a link, and the second base station identifier is used for identifying a base station where the UE that fails to establish a link is located after a link is successfully established;
if the statistical information comprises only the information related to the CO of the base station, the statistical information comprises: the number of UEs in a CO area and a second identifier set formed of at least one base station identifier pair; the base station identifier pair comprises base station identifiers of at least two base stations with reference signal received power RSRP exceeding a first threshold value among the base stations identified by the UEs served by the base stations; and
if the statistical information comprises the information related to the CH and the information related to the CO of the base station, the statistical information comprises: the number of UEs in the CH area, the first identifier set, the number of UEs in the CO area, and the second identifier set.

19. The network coordination controller according to claim 18, further comprising instructions that, when executed by the processor, cause the network coordination controller to:
select a base station identifier that appears the largest number of times in the first identifier set of the statistical information as a hole base station identifier;
form a CH cluster according to the selected hole base station identifier;
delete the base station identifier in the CH cluster from the first identifier set to update the first identifier set; and
detect whether the updated first identifier set is empty.

20. The network coordination controller according to claim 19, further comprising instructions that, when executed by the processor, cause the network coordination controller to:
detect whether at least one first association base station identifier with the number of times of being associated with the hole base station identifier exceeding a second threshold value exists; and
if it is detected that at least one first association base station identifier with the number of times of being associated with the hole base station identifier being larger than the second threshold value exists, form the hole base station identifier and the at least one first association base station identifier into one CH cluster; and if it is detected that at least one first association base station identifier with the number of times of being associated with the hole base station identifier exceeding a second threshold value does not exist, form the hole base station identifier into one CH cluster.

21. The network coordination controller according to claim 18, further comprising instructions that, when executed by the processor, cause the network coordination controller to:
    select a base station identifier that appears the largest number of times in the second identifier set of the statistical information as an overlap base station identifier;
    form a CO cluster according to the selected overlap base station identifier;
    delete the base station identifier in the CO cluster from the second identifier set to update the second identifier set; and
    detect whether the updated second identifier set is empty.

22. The network coordination controller according to claim 21, further comprising instructions that, when executed by the processor, cause the network coordination controller to:
    detect whether at least one second association base station identifier with the number of times of being associated with the overlap base station identifier exceeding a third threshold value exists; and
    if it is detected that at least one second association base station identifier with the number of times of being associated with the overlap base station identifier exceeding the third threshold value exists, form the overlap base station identifier and the at least one second association base station identifier into one CO cluster; and if it is detected that at least one second association base station identifier with the number of times of being associated with the overlap base station identifier exceeding the third threshold value does not exist, form the overlap base station identifier into one CO cluster.

23. The network coordination controller according to claim 17, further comprising instructions that, when executed by the processor, cause the network coordination controller to:
    detect whether the entire-network utility value is larger than a fourth threshold value;
    if the entire-network utility value is larger than the fourth threshold value, the capacity or coverage weight and the antenna downtilt of each base station in all the coverage clusters do not need to be adjusted; and
    if the entire-network utility value is not larger than the fourth threshold value, the capacity or coverage weight and the antenna downtilt of each base station in all the coverage clusters need to be adjusted; or,
    detect whether a difference value between the entire-network utility value and an entire-network utility value in the previous adjustment process is smaller than a fifth threshold value;
    if the difference value is smaller than the fifth threshold value, the capacity or coverage weight and the antenna downtilt of each base station in all the coverage clusters do not need to be adjusted; and
    if the difference value is not smaller than the fifth threshold value, the capacity or coverage weight and the antenna downtilt of each base station in all the coverage clusters need to be adjusted.

24. The network coordination controller according to claim 17, further comprising instructions that, when executed by the processor, cause the network coordination controller to:
    divide a preset range according to the value range of the cluster value of the coverage cluster, and preset a maximum adjustable value for the capacity or coverage weight corresponding to each preset range and a maximum adjustment value for the antenna downtilt corresponding to each preset range;
    determine a preset range at which a cluster value of each coverage cluster is;
    learn the maximum adjustable value for the capacity or coverage weight corresponding to the preset range and the maximum adjustable value for the antenna downtilt corresponding to the preset range; the preset range is a range divided from the value range of the cluster value of the coverage cluster in advance,
    acquire the number of neighboring base stations of each base station within the coverage cluster of the base station; and
    according to the acquired number of neighboring base stations of each base station, the maximum adjustable value for the capacity or coverage weight, and the maximum adjustable value for the antenna downtilt, obtain the adjustment value for the capacity or coverage weight of each base station and the adjustment value for the antenna downtilt of each base station within the coverage cluster.

25. The network coordination controller according to claim 24, further comprising instructions that, when executed by the processor, cause the network coordination controller to:
    according to formulas $$\Delta tilt_j = \frac{N_j (tilt)_{max}}{6} \text{ and } \Delta w_{l,j} = \frac{N_j \Delta w_{l,max}}{6},$$

obtain the adjustment value for the capacity or coverage weight of each base station and the adjustment value for the antenna downtilt of each base station within the coverage cluster;
    wherein j denotes a sequence number of a base station; $\Delta tilt_j$ denotes an adjustment value for the antenna downtilt of the base station j, $\Delta w_{l,j}$ denotes an adjustment value for the capacity or coverage weight of the base station j, $\Delta w_{l,max}$ denotes the maximum adjustable value for the capacity or coverage weight of the coverage cluster, when $l=1$, $\Delta w_{l,j}$ denotes an adjustment value for the capacity weight of the base station j, $\Delta w_{l,max}$ denotes the maximum adjustable value for the capacity weight of the coverage cluster, when $l=2$, $\Delta w_{l,j}$ denotes an adjustment value for the coverage weight of the base station j, $\Delta w_{l,max}$, denotes the maximum adjustable value for the coverage weight of the coverage cluster, $N_j$ denotes the number of neighboring base stations of the base station j within the coverage cluster; and $\Delta tilt_{max}$ denotes the maximum adjustable value for the antenna downtilt of the coverage cluster.

26. The network coordination controller according to claim 17, further comprising instructions that, when executed by the processor, cause the network coordination controller to:
    if a current adjustment is any adjustment other than a first adjustment, according to a preset modeling function, calculate a value of each independent variable minimizing a dependent variable of the modeling function within a preset condition, the modeling function is a functional relationship of the dependent variable with the independent variable and a coefficient, each independent variable denotes the capacity or coverage weight and the antenna downtilt of each base station in an entire network, the dependent variable denotes an entire-network CH or an entire-network CO, the coefficient denotes a minimum error correlation value between a minimum value of the dependent variable after the previous adjustment and an entire-network CH value and entire-network CO value acquired during the previous adjustment; and the preset condition is a range of the independent variable during the calculation of the minimum value of the dependent variable; and if the current adjustment is the first adjustment, according to the preset modeling function, calculate the dependent variable and the coefficient according to a preset value of each independent variable.

27. A base station, comprising:
a processor; and
memory coupled to the processor, the memory comprising instructions that, when executed by the processor, cause the base station to:
receive coverage information sent by a user equipment (UE), wherein the coverage information comprises coverage hole (CH) information and/or coverage overlap (CO) information, the CH information comprises a first base station identifier, the first base station identifier is used for identifying a base station with a CH detected by a UE that fails to establish a link, and the CO information comprises base station identifiers of at least two base stations with reference signal received power (RSRP) exceeding a first threshold value among all base stations identified by the UE;
according to the coverage information, acquire statistical information, and acquire a first count, wherein the first count is the number of all UEs served in the base station, the statistical information comprises information related to a coverage hole CH of the base station and/or information related to a coverage overlap CO of the base station;
send the acquired statistical information and the acquired first count to a network coordination controller, so that the network controller establishes at least one coverage cluster according to the statistical information and the first count, learns an entire-network utility value, and determines, according to the entire-network utility value, whether a capacity or coverage weight and an antenna downtilt of each base station in all the coverage clusters need to be adjusted, if the adjustment is needed, acquires an adjustment value for the capacity or coverage weight of each base station and an adjustment value for the antenna downtilt of each base station according to an optimization strategy and sends the adjustment values to a corresponding base station;
receive the adjustment value for the capacity or coverage weight and the adjustment value for the antenna downtilt that are sent by the network coordination controller;
determine whether the adjustment value for the capacity or coverage weight and the adjustment value for the antenna downtilt are zero;
if neither the adjustment value for the capacity or coverage weight nor the adjustment value for the antenna downtilt is zero, according to the adjustment value for the capacity or coverage weight and the adjustment value for the antenna downtilt, calculate the optimal pilot power; and
adjust pilot power of the base station to the calculated optimal pilot power, and adjust a value of the antenna downtilt to the adjustment value for the antenna downtilt, so as to adjust the capacity and coverage of the base station.

28. The base station according to claim 27, further comprising instructions that, when executed by the processor, cause the base station to:
if the coverage information sent by the UE and received comprises only CH information, the statistical information comprises only the information related to the CH of the base station, and comprises: the number of UEs in a CH area and a first identifier set formed of at least one base station identifier pair,
count UEs that send the CH information to obtain the number of the UEs that send the CH information,
use the number of the UEs that send the CH information as the number of UEs in the CH area, and
according to the CH information, acquire the base station identifier pair, form the at least one base station identifier pair into the first identifier set, the base station identifier pair comprises the first base station identifier and a second base station identifier, and the second base station identifier is used for identifying a base station where the UE that fails to establish a link is located after a link is successfully established;
if the coverage information sent by the UE and received comprises only CO information, the statistical information comprises only the information related to the CO of the base station, and comprises: the number of UEs in a CO area and a second identifier set formed of at least one base station identifier pair,
count UEs that send the CO information to obtain the number of the UEs that send the CO information,
use the number of the UEs that send the CO information as the number of the UEs in the CO area, and
according to the CO information, acquire base station identifiers of at least two base stations with reference signal received power RSRP exceeding the first threshold value among all base stations identified by the UE, form the acquired base station identifiers of at least two base stations into the base station identifier pair, and form the at least one base station identifier pair into the second identifier set;
if the coverage information sent by the UE and received comprises CH information and CO information, the statistical information comprises the information related to the CH and the information related to the CO of the base station, and comprises: the number of UEs in the CH area, the first identifier set, the number of UEs in the CO area, and the second identifier set,
count UEs that send the CH information to obtain the number of the UEs that send the CH information,
use the number of the UEs that send the CH information as the number of UEs in the CH area, and
according to the CH information, acquire the base station identifier pair, and form the at least one base station identifier pair into the first identifier set, the base station count UEs that send the CO information to obtain the number of the UEs that send the CO information, use the number of the UEs that send the CO information as the number of UEs in the CO area, and according to the CO information, acquire the base station identifiers of at least two base stations with reference signal received power RSRP exceeding the first threshold value among all base stations identified by the UE in the CO area, form the acquired station identifiers of at least two base stations into the base station identifier pair, and form the at least one base station identifier pair into the second identifier set.

29. The base station according to claim 27, further comprising instructions that, when executed by the processor, cause the base station to: use a formula $p_j = \max w_{1,j}^L Cap_j + w_{2,j}^L Cov_j$ to calculate the optimal pilot power, wherein:
$p_j$ denotes the pilot power of the base station j, j denotes a sequence number of a base station, and j is an integer, $w_{1,j}^L$ denotes a capacity weight, $w_{2,j}^L$ denotes a coverage weight; L is Local (local) and denotes a capacity weight and a coverage weight within the base station j; $Cap_j$ denotes an average spectral efficiency of the base station, $$Cap_j = \frac{\sum_{k=1}^{K_j} \log(1 + SINR_{j,k})}{K_j},$$

$K_j$ denotes a total number of users of the base station; $Cov_j$ denotes a spectral efficiency of a % of users with the worst signal among all users of the base station j, a value range of a is (0, 100], $Cov_j$=quantile(log(1+SIN $R_{j,k}$), a %); SIN $R_{j,k}$ is a reference signal of the kth user of the base station, k =1, 2, 3,. . ., and $K_j$, denoting the 1st user, 2nd user, 3rd user, . . ., and $K_j$ th user of the base station;

$$SINR_{j,k} = \frac{p_j h_{j,k}}{\sigma^2 + \sum_{d \in I_j} p_d h_{d,k}},$$

d denotes an identifier of a neighboring base station that interferes with the base station; Ij is a set of the base station identifiers of all interference neighboring cell base stations; $P_d$ denotes pilot power of the interference neighboring cell base station, $h_{d,k}$ denotes a channel gain of the interference neighboring cell base station d to the kth user of the base station j, $h_{j,k}$, denotes a channel gain of the kth user of the base station j, $h_{j,k}$=$PL_{j,k}$(d)·$SF_{j,k}$·$G_{j,k}(\phi\theta)$, $PL_{j,d}$(d) denotes a transmission path loss related to a distance of the kth user of the base station j, $SF_{j,k}$ denotes shadow fading of the kth user of the base station j, and $G_{j,k}(\phi\theta)$ denotes an antenna gain combining an azimuth and an angle elevation of the kth user of the base station.

30. The base station according to claim 27, further comprising instructions that, when executed by the processor, cause the base station to:
preset a first pilot power tree; form the first pilot power tree into a first pilot power tree set, the number of the first pilot power trees in the first pilot power tree set is larger than or equal to a first preset value; the first preset value is the number of pieces of pilot power that needs to be calculated preset by the base station; the pilot power tree refers to that a leaf node of the tree bears a value or adjustment value of the pilot power of the base station;
according to the pilot power of the first pilot power tree in the first pilot power tree set, acquire a first local utility value corresponding to the first pilot power tree;
according to all the acquired first local utility values, select a first pilot power tree from the first pilot power trees as a second pilot power tree, and acquire a second local utility value corresponding to the second pilot power tree, form the at least one second pilot power tree into a second pilot power tree set, the number of the selected first pilot power trees is equal to the first preset value;
perform a genetic operation on the second pilot power tree in the second pilot power tree set to acquire a third pilot power tree, acquire a third local utility value corresponding to the third pilot power, and form the third pilot power tree into a third pilot power tree set;
according to select a pilot power tree, from the second pilot power tree set and the third pilot power tree set according to all the second local utility values and the third local utility values, or from the third pilot power tree set according to the third local utility values; the number of the pilot power trees is equal to the first preset value;
use the pilot power tree selected by the first selection module to update the second pilot power tree in the second pilot power tree set;
acquire the updated second pilot power tree and acquire the second local utility value corresponding to the updated second pilot power tree in the second pilot power tree set;
select the optimal local utility value from the updated second local utility values;
determine whether a difference value between the two times of optimal local utility values is smaller than a sixth threshold value; the difference value between the two times of optimal local utility values refers to the difference value between the optimal local utility value acquired the current time and the optimal local utility value acquired after the previous adjustment;
record the value of a cycle number;
determine whether the value of the cycle number reaches a preset value; if it is determined that the difference value between the two times of optimal local utility values is not smaller than the sixth threshold value and the value of the cycle number does not reach the preset value, trigger the base station to perform a genetic operation on the second pilot power tree in the second pilot power tree set to acquire the third pilot power tree; and
if it is determined that the difference value between the two times of optimal local utility values is smaller than the sixth threshold value, or it is determined that the value of the cycle number reaches the preset value, according to the optimal local utility value acquired the current time, find the optimal second pilot power tree corresponding to the optimal local utility value, and acquire the optimal pilot power from the optimal second pilot power tree.

31. The base station according to claim 30, further comprising instructions that, when executed by the processor, cause the base station to:
according to the pilot power of the first pilot power tree in the first pilot power tree set, adjust the pilot power of the base station;
monitor the values of the capacity and coverage of the base station after each pilot power adjustment;
according to the monitored values of the capacity and coverage, the adjustment value for the capacity weight, and the adjustment value for the coverage weight, calculate the first local utility value corresponding to the first pilot power tree after each pilot power adjustment.

32. The base station according to claim 30, further comprising instructions that, when executed by the processor, cause the base station to:
perform the genetic operation on the second pilot power tree in the second pilot power tree set;
acquire the third pilot power tree;
according to the pilot power of the third pilot power tree in the third pilot power tree set, adjust the pilot power of the base station;
monitor the values of the capacity and coverage of the base station after adjusting the pilot power of the base station according to the pilot power of the third pilot power tree;
according to the monitored values of the capacity and coverage of the base station, the adjustment value for the capacity weight, and the adjustment value for the coverage weight, calculate the third local utility value corresponding to the third pilot power tree after each pilot power adjustment; and form the third pilot power tree into the third pilot power tree set.

33. A system for optimizing a tradeoff between capacity and coverage of a network, the system comprising:

a network coordination controller and a base station, wherein:

the network coordination controller is configured to:

receive statistical information and a first count that are sent by a base station, wherein the first count is the number of all user equipments (UEs) counted by the base station, the statistical information comprises information related to a coverage hole (CH) of the base station and/or information related to a coverage overlap (CO) of the base station;

establish at least one coverage cluster according to the received statistical information;

calculate cluster values of all the coverage clusters according to the first count and the statistical information, wherein the coverage cluster is used for recording a base station identifier related to the CH or a base station identifier related to the CO, and the cluster value is a CH value or a CO value of each coverage cluster;

acquire an entire-network CH value and an entire-network CO value according to the cluster values of all the coverage clusters;

calculate an entire-network utility value according to the entire-network CH value and the entire-network CO value; determine, according to the entire-network utility value, whether a capacity or coverage weight and an antenna downtilt of each base station in all the coverage clusters need to be adjusted; if the adjustment is needed, acquire an adjustment value for the capacity or coverage weight of each base station and an adjustment value for the antenna downtilt of each base station according to an optimization strategy; and send the acquired adjustment value for the capacity or coverage weight of each base station and the acquired adjustment value for the antenna downtilt of each base station to a corresponding base station, so that the base station calculates the optimal pilot power; and the base station is configured to:

receive coverage information sent by a user equipment UE, wherein the coverage information comprises coverage hole CH information and/or coverage overlap CO information, the CH information comprises a first base station identifier, the first base station identifier is used for identifying a base station with a CH detected by a UE that fails to establish a link, and the CO information comprises base station identifiers of at least two base stations with reference signal received power (RSRP) exceeding a first threshold value among all base stations identified by the UE;

according to the coverage information: acquire statistical information, and acquire a first count;

send the statistical information and the first count to a network controller, so that the network controller establishes at least one coverage cluster according to the statistical information and the first count, learns the entire-network utility value, and determines, according to the entire-network utility value, whether the capacity or coverage weight and the antenna downtilt of each base station in all the coverage clusters need to be adjusted, if the adjustment is needed, according to the optimization strategy, acquires the adjustment value for the capacity or coverage weight of each base station and the adjustment value for the antenna downtilt of each base station and sends the adjustment values to a corresponding base station, wherein the first count is the number of all UEs served in the base station, and the statistical information comprises the information related to the coverage hole CH and/or the information related to the coverage overlap CO of the base station;

receive the adjustment value for the capacity or coverage weight and the adjustment value for the antenna downtilt sent by the network coordination controller;

if neither the adjustment value for the capacity or coverage weight nor the adjustment value for the antenna downtilt is zero, according to the adjustment value for the capacity or coverage weight and the adjustment value for the antenna downtilt, calculate the optimal pilot power; and adjust pilot power of the base station to the calculated optimal pilot power, and adjust a value of the antenna downtilt to the adjustment value for the antenna downtilt, so as to adjust the capacity and coverage of the base station.

* * * * *